US007661116B2

(12) United States Patent
Slaney et al.

(10) Patent No.: US 7,661,116 B2
(45) Date of Patent: Feb. 9, 2010

(54) AUCTION FOR TARGETED CONTENT

(75) Inventors: Malcolm Slaney, Los Altos Hills, CA (US); Bonnie M. Johnson, Palo Alto, CA (US); Annarosa Tomasi, Menlo Park, CA (US); Matthew B. Humphries, Cupertino, CA (US)

(73) Assignee: Vulcan Patents LLC, Seattle, WA (US)

( * ) Notice: Subject to any disclaimer, the term of this patent is extended or adjusted under 35 U.S.C. 154(b) by 294 days.

(21) Appl. No.: 11/869,369

(22) Filed: Oct. 9, 2007

(65) Prior Publication Data
US 2008/0109284 A1 May 8, 2008

Related U.S. Application Data

(63) Continuation of application No. 09/724,956, filed on Nov. 28, 2000, now abandoned, which is a continuation-in-part of application No. 09/514,056, filed on Feb. 25, 2000, now Pat. No. 6,574,793.

(60) Provisional application No. 60/198,039, filed on Apr. 18, 2000, provisional application No. 60/198,037, filed on Apr. 18, 2000, provisional application No. 60/198,038, filed on Apr. 18, 2000, provisional application No. 60/198,036, filed on Apr. 18, 2000, provisional application No. 60/198,034, filed on Apr. 18, 2000, provisional application No. 60/185,182, filed on Feb. 25, 2000.

(51) Int. Cl.
*H04N 7/10* (2006.01)
*H04N 7/025* (2006.01)
*H04N 60/33* (2006.01)
*H04H 20/14* (2008.01)
*H04H 60/29* (2008.01)

(52) U.S. Cl. .............. 725/22; 725/9; 725/12; 725/32; 725/34

(58) Field of Classification Search .............. 725/9, 725/12, 22, 32, 34
See application file for complete search history.

(56) References Cited

U.S. PATENT DOCUMENTS 3,868,675 A    2/1975   Firmin (Continued)

FOREIGN PATENT DOCUMENTS

JP              2054331        2/1990

(Continued)

OTHER PUBLICATIONS

"About GAIN Ad Vehicles," http://www.gainpublishing.com/about, pp. 1-2 [Internet accessed Apr. 26, 2004].

(Continued)

*Primary Examiner*—Dominic D Saltarelli
(74) *Attorney, Agent, or Firm*—Perkins Coie LLP

(57) ABSTRACT

Displaying personalized content to content observers by content providers (e.g., advertisers) who disseminate content over a network is disclosed. In particular, enabling the display of targeted content to television viewers is disclosed. Identification of the content observer(s) observing a content display device at a particular time (and/or identification of the content display site) is made, and targeted content for display is selected based on a determination of content appropriate for display to those content observer(s) in accordance with a criterion based on the identity and/or a characteristic of the content observer(s) (and/or the content display site). The attention of each content observer can be sold to the content provider that places the highest value on that content observer's attention. In particular, the value paid by content providers over time can be maximized.

20 Claims, 5 Drawing Sheets

U.S. PATENT DOCUMENTS

| | | |
|---|---|---|
| 4,258,386 A | 3/1981 | Cheung et al. |
| 4,319,286 A | 3/1982 | Hanpachern |
| 4,390,904 A | 6/1983 | Johnston et al. |
| 4,546,382 A | 10/1985 | McKenna et al. |
| 4,602,279 A | 7/1986 | Freeman |
| 4,750,053 A | 6/1988 | Allen |
| 4,782,401 A | 11/1988 | Faerber et al. |
| 4,841,291 A | 6/1989 | Swix et al. |
| 4,845,658 A | 7/1989 | Gifford |
| 4,858,000 A | 8/1989 | Lu |
| 4,907,079 A | 3/1990 | Turner et al. |
| 4,931,865 A | 6/1990 | Scarampi |
| 5,105,184 A | 4/1992 | Pirani et al. |
| 5,164,992 A | 11/1992 | Turk et al. |
| 5,223,924 A | 6/1993 | Strubbe |
| 5,231,494 A | 7/1993 | Wachob |
| 5,295,064 A | 3/1994 | Malec et al. |
| 5,305,195 A | 4/1994 | Murphy |
| 5,347,632 A | 9/1994 | Filepp et al. |
| 5,410,344 A | 4/1995 | Graves et al. |
| 5,422,986 A | 6/1995 | Neely |
| 5,436,637 A | 7/1995 | Gayraud et al. |
| 5,440,337 A | 8/1995 | Henderson et al. |
| 5,446,919 A | 8/1995 | Wilkins et al. |
| 5,481,294 A | 1/1996 | Thomas et al. |
| 5,497,185 A | 3/1996 | Dufresne et al. |
| 5,498,002 A | 3/1996 | Gechter |
| 5,504,518 A | 4/1996 | Ellis et al. |
| 5,515,098 A | 5/1996 | Carles |
| 5,532,735 A | 7/1996 | Blahut et al. |
| 5,546,071 A | 8/1996 | Zdunich |
| 5,550,735 A | 8/1996 | Slade et al. |
| 5,550,928 A | 8/1996 | Lu et al. |
| 5,550,965 A | 8/1996 | Gabbe et al. |
| 5,559,549 A | 9/1996 | Hendricks et al. |
| 5,572,643 A | 11/1996 | Judson |
| 5,579,055 A | 11/1996 | Hamilton et al. |
| 5,583,560 A | 12/1996 | Florin et al. |
| 5,589,892 A | 12/1996 | Knee et al. |
| 5,596,373 A | 1/1997 | White et al. |
| 5,600,364 A | 2/1997 | Hendricks et al. |
| 5,600,573 A | 2/1997 | Hendricks et al. |
| 5,608,445 A | 3/1997 | Mischler et al. |
| 5,619,709 A | 4/1997 | Caid et al. |
| 5,659,350 A | 8/1997 | Hendricks et al. |
| 5,661,516 A | 8/1997 | Carles |
| 5,682,195 A | 10/1997 | Hendricks et al. |
| 5,704,017 A | 12/1997 | Heckerman |
| 5,708,478 A | 1/1998 | Tognazzini |
| 5,717,814 A | 2/1998 | Abecassis |
| 5,717,923 A | 2/1998 | Dedrick |
| 5,724,091 A | 3/1998 | Freeman et al. |
| 5,724,424 A | 3/1998 | Gifford |
| 5,724,472 A | 3/1998 | Abecassis |
| 5,724,521 A | 3/1998 | Dedrick |
| 5,729,279 A | 3/1998 | Fuller |
| 5,734,853 A | 3/1998 | Hendricks et al. |
| 5,740,549 A | 4/1998 | Reilly et al. |
| 5,754,939 A | 5/1998 | Herz et al. |
| 5,758,258 A | 5/1998 | Shoff et al. |
| 5,761,606 A | 6/1998 | Wolzien |
| 5,767,857 A | 6/1998 | Neely |
| 5,767,894 A | 6/1998 | Fuller et al. |
| 5,768,528 A | 6/1998 | Stumm |
| 5,771,307 A | 6/1998 | Lu et al. |
| 5,774,170 A | 6/1998 | Hite et al. |
| 5,786,845 A | 7/1998 | Tsuria et al. |
| 5,793,409 A | 8/1998 | Tetsumura et al. |
| 5,794,210 A | 8/1998 | Goldhaber et al. |
| 5,798,785 A | 8/1998 | Hendricks et al. |
| 5,801,747 A | 9/1998 | Bedard |
| 5,805,974 A | 9/1998 | Hite et al. |
| 5,812,647 A | 9/1998 | Beaumont et al. |
| 5,812,732 A | 9/1998 | Dettmer et al. |
| 5,818,512 A | 10/1998 | Fuller |
| 5,819,284 A | 10/1998 | Farber et al. |
| 5,826,165 A | 10/1998 | Echeita et al. |
| 5,828,839 A | 10/1998 | Moncreiff |
| 5,862,324 A | 1/1999 | Collins |
| 5,872,588 A | 2/1999 | Aras et al. |
| 5,872,850 A | 2/1999 | Klein et al. |
| 5,873,068 A | 2/1999 | Beaumont et al. |
| 5,874,986 A | 2/1999 | Gibbon et al. |
| 5,877,755 A | 3/1999 | Hellhake |
| 5,892,535 A | 4/1999 | Allen et al. |
| 5,892,554 A | 4/1999 | DiCicco et al. |
| 5,892,691 A | 4/1999 | Fowler |
| 5,900,919 A | 5/1999 | Chen et al. |
| 5,903,816 A | 5/1999 | Broadwin et al. |
| 5,907,322 A | 5/1999 | Kelly et al. |
| 5,913,040 A | 6/1999 | Rakavy et al. |
| 5,915,243 A | 6/1999 | Smolen |
| 5,917,553 A | 6/1999 | Honey et al. |
| 5,918,014 A | 6/1999 | Robinson |
| 5,926,207 A | 7/1999 | Vaughan et al. |
| 5,929,849 A | 7/1999 | Kikinis |
| 5,933,150 A | 8/1999 | Ngo et al. |
| 5,933,811 A | 8/1999 | Angles et al. |
| 5,945,988 A | 8/1999 | Williams et al. |
| 5,946,646 A | 8/1999 | Schena et al. |
| 5,948,061 A | 9/1999 | Merriman et al. |
| 5,953,076 A | 9/1999 | Astle et al. |
| 5,959,623 A | 9/1999 | van Hoff et al. |
| 5,966,120 A | 10/1999 | Arazi et al. |
| 5,974,398 A | 10/1999 | Hanson et al. |
| 5,977,964 A | 11/1999 | Williams et al. |
| 5,990,927 A | 11/1999 | Hendricks et al. |
| 6,002,393 A | 12/1999 | Hite et al. |
| 6,002,833 A | 12/1999 | Abecassis |
| 6,005,564 A | 12/1999 | Ahmad et al. |
| 6,006,197 A * | 12/1999 | d'Eon et al. ............... 705/10 |
| 6,006,257 A | 12/1999 | Slezak |
| 6,008,802 A | 12/1999 | Iki et al. |
| 6,011,895 A | 1/2000 | Abecassis |
| 6,020,883 A | 2/2000 | Herz et al. |
| 6,020,931 A | 2/2000 | Bilbrey et al. |
| 6,026,369 A | 2/2000 | Capek |
| 6,029,045 A | 2/2000 | Picco et al. |
| 6,034,652 A | 3/2000 | Freiberger et al. |
| 6,036,601 A | 3/2000 | Heckel |
| 6,038,367 A | 3/2000 | Abecassis |
| 6,044,376 A | 3/2000 | Kurtzman, II |
| 6,052,492 A | 4/2000 | Bruckhaus |
| 6,052,554 A | 4/2000 | Hendricks et al. |
| 6,075,551 A | 6/2000 | Berezowski et al. |
| 6,100,941 A | 8/2000 | Dimitrova et al. |
| 6,104,425 A | 8/2000 | Kanno et al. |
| 6,112,192 A | 8/2000 | Capek |
| 6,141,010 A | 10/2000 | Hoyle |
| 6,141,463 A | 10/2000 | Covell et al. |
| 6,160,570 A | 12/2000 | Sitnik |
| 6,169,542 B1 | 1/2001 | Hooks et al. |
| 6,177,931 B1 | 1/2001 | Alexander et al. |
| 6,208,386 B1 | 3/2001 | Wilf et al. |
| 6,237,022 B1 * | 5/2001 | Bruck et al. ............... 709/201 |
| 6,240,555 B1 | 5/2001 | Shoff et al. |
| 6,243,104 B1 | 6/2001 | Murray |
| 6,282,713 B1 | 8/2001 | Kitsukawa et al. |
| 6,286,005 B1 * | 9/2001 | Cannon ............... 707/100 |
| 6,314,569 B1 | 11/2001 | Chernock et al. |
| 6,324,519 B1 | 11/2001 | Eldering |
| 6,351,265 B1 | 2/2002 | Bulman |

| | | | |
|---|---|---|---|
| 6,357,043 | B1 | 3/2002 | Ellis et al. |
| 6,438,751 | B1 | 8/2002 | Voyticky et al. |
| 6,457,010 | B1 | 9/2002 | Eldering et al. |
| 6,519,769 | B1 | 2/2003 | Hopple et al. |
| 6,560,281 | B1 | 5/2003 | Black et al. |
| 6,570,499 | B2 | 5/2003 | Kaganer |
| 6,574,793 | B1 | 6/2003 | Ngo et al. |
| 6,597,405 | B1 | 7/2003 | Iggulden |
| 6,615,408 | B1 | 9/2003 | Kaiser et al. |
| 6,681,393 | B1 | 1/2004 | Bauminger et al. |
| 6,684,194 | B1 | 1/2004 | Eldering et al. |
| 6,698,020 | B1 | 2/2004 | Zigmond et al. |
| 6,708,335 | B1 | 3/2004 | Ozer et al. |
| 6,735,776 | B1 | 5/2004 | Legate |
| 6,750,880 | B2 | 6/2004 | Freiberger et al. |
| 6,788,314 | B1 | 9/2004 | Freiberger et al. |
| 6,906,732 | B1 | 6/2005 | Li et al. |
| 6,968,565 | B1 | 11/2005 | Slaney et al. |
| 6,993,245 | B1 | 1/2006 | Harville |
| 7,134,130 | B1 | 11/2006 | Thomas |
| 7,134,132 | B1 | 11/2006 | Ngo et al. |
| 7,348,935 | B1 | 3/2008 | Freiberger et al. |
| 7,409,437 | B2 | 8/2008 | Ullman et al. |
| 2002/0046084 | A1 | 4/2002 | Steele et al. |
| 2002/0131760 | A1 | 9/2002 | Hirai et al. |
| 2003/0110499 | A1 | 6/2003 | Knudson et al. |
| 2003/0200128 | A1 | 10/2003 | Doherty |
| 2004/0194131 | A1 | 9/2004 | Ellis et al. |

FOREIGN PATENT DOCUMENTS

| | | |
|---|---|---|
| JP | 4051628 | 2/1992 |
| WO | WO-94/13107 | 6/1994 |
| WO | WO-95/15649 | 6/1995 |
| WO | WO-95/15658 | 6/1995 |
| WO | WO-96/24115 | 8/1996 |
| WO | WO-97/00494 | 1/1997 |
| WO | WO-97/00581 | 1/1997 |
| WO | WO-97/00582 | 1/1997 |
| WO | WO-97/41683 | 11/1997 |
| WO | WO-98/24242 | 6/1998 |
| WO | WO-98/24243 | 6/1998 |
| WO | WO-98/28906 | 7/1998 |
| WO | WO-99/38320 | 7/1999 |
| WO | WO-99/45702 | 9/1999 |
| WO | WO-99/52285 | 10/1999 |
| WO | WO-99/55066 | 10/1999 |
| WO | WO-99/60789 | 11/1999 |
| WO | WO-00/22818 | 4/2000 |
| WO | WO-00/33160 | 6/2000 |
| WO | WO-00/33163 | 6/2000 |
| WO | WO-00/33228 | 6/2000 |
| WO | WO-00/33233 | 6/2000 |

OTHER PUBLICATIONS

"Double Click Press Kit," www.doubleclick.com, 2 pages.
"GAIN—Support Center," http://www.gainpublishing.com/help/gainfaq.html, pp. 1-5 [Internet accessed Apr. 26, 2004].
"GAIN Publishing-Software," http://www.gainpublishing.com/software, pp. 1-3 [Internet accessed Apr. 26, 2004].
"General Instrument & ACTV to Offer a Complete Solution for Addressable, Targeted Digital Television Advertising," ACTV and The BOX Music Network, Press Release, www.actv.com/newpage/press/actvgiad.html, Jun. 14, 1999, 3 pages.
"Scientific-Atlanta's Explorer 2000 Advanced Digital Set-Top Will Support ACTV's 'Inidvidualized Television'," ACTV and Scientific-Atlanta, Press Release, www.actv.com/newpage/press/actvsatl.html, Jan. 25, 1999, 3 pages.
"What is Wink: How wink works," www.wink.com, 3 pages.
Adauction.com, http://web.archive.org/web/20000302051902/http://www.adauction.com, pp. 1-2, internet archive date of Mar. 2, 2000 [accessed Apr. 6, 2007].
Bregler et al., "Video Rewrite: Driving Visual Speech with Audio, Interval Research Corporation," Abstract and ACM SIGGRAPH 97 Paper, 10 pages.
Claria, Products and Services Overview, http://www.clairia.com/products/index.html, pp. 1-3 [Internet accessed Apr. 26, 2004].
Darrell et al., "A Virtual Mirror Interface using Real-time Robust Face Tracking," Proceedings of the Third International Conference on Face and Gesture Recognition, Apr. 1998, IEEE Computer Society Press, Nara, Japan, 20 pages.
Delio, M., "TV Commercials Get Personal," Wired News, Sep. 20, 2000, www.wired.com/news/print/0.1294.38754.00.html, 3 pages.
Koenen, R., "Overview of the MPEG-4 Standard," International Organisation for Standardisation Organisation Internatioanale De Normalisation ISO/IEC JTC1/SC29/WG11 Coding of Moving Pictures and Audio, ISO/IEC JTC1/SC29/WG11 N4030, Mar. 2001, http://www.cselt.it/mpeg/standars/mpeg-4/mpeg-4.htm, pp. 1-78.
Lyon, R.F., "The Optical Mouse, and an Architectural Methodology for Smart Digital Sensors," Xerox PARC, VLSI-81-1, Aug. 1981, 38 pages.
Moghaddam et al., "Research Index: Probabilistic Visual learning for Object Detection," http://citeseer.nj.nec.com/moghaddam95probabilistic.html, 1995, 3 pages.
Moghaddam, B. et al., "Abstract: Probabilistic Visual learning for Object Detection," IEEE Transactions on Pattern Analysis and Machine Intelligence, vol. 19, No. 7, Jul. 1997, www.computer.org/tpami/tp1997/i0696abs.htm, 1 page.
Sutton et al., "Reinforcement Learning: An Introduction," http://www-anw.cs.umass.edu/~rich/book/the-book.html, MIT Press, Cambridge, MA, 1998, 4 pages.
Gomes, "Upstart's Internet 'TV' Has Microsoft Tuned In," Wall Street Journal, Aug. 1996, 1 page.
Rigdon, "Screen Savers Go Beyond Fish, Flying Toasters," Wall Street Journal, Feb. 13, 1996, 1 page.
Staff Reporter, "PointCast Inc. is Testing New Screen-Saver Product," Wall Street Journal, May 1996, 1 page.
Non-Final Office Action for U.S. Appl. No. 11/250,083, Mail Date Jun. 23, 2009, 16 pages.
Letter of Interrogation for Japanese Application No. 1997-533741, Mail Date Jun. 16, 2009, 7 pages.
Tokuda, "To Make the Internet Free-Mr. Y. Itakura (president of Hyper-net company)", Nikkei Business Publications, Inc., Mar. 11, 1996, Japan, No. 831, p. 136-140.
Fujikawa, "Subrogation of User Account by Advertisement", Nikkei Communications, Nikkei BP Company, Mar. 4, 1996, Japan, No. 217, p. 54.
Bove, M. et al., "Adding Hyperlinks to Digital Television," MIT Media Laboratory, Proc. 140th SMPTE Technical Conference, 1998, 11 pages.
Ebert, R., "The Incredible Shrinking Media Lab," Y-Life: Roger Ebert-Critical Eye, Mar. 1999, http://www.zdnet.com, 3 pgs. [Internet accessed on Nov. 23, 1999].
"MIT Media Lab's Hypersoap uses hyperlinks to mix shopping, entertainment," MIT News, Nov. 9, 1998, 3 pgs. [Internet accessed on Nov. 23, 1999].
AsSeenIn.com, http://www.asseenin.com/asseenin/infor, 3 pgs. [Internet accessed on Jan. 12. 2000].
Non-Final Office Action for U.S. Appl. No. 09/789,926, Mail Date Aug. 12, 2009, 19 pages.

* cited by examiner

AUCTION FOR TARGETED CONTENT

CROSS-REFERENCE TO RELATED APPLICATIONS

This application is a continuation of U.S. patent application Ser. No. 09/724,956, filed on Nov. 28, 2000 now abandoned, which is a continuation-in-part of U.S. patent application Ser. No. 09/514,056, filed on Feb. 25, 2000 now U.S. Pat. No. 6,574,793, which claims the benefit of U.S. provisional patent application Ser. Nos. 60/198,039, 60/198,037, 60/198,038, 60/198,036 and 60/198,034, filed on Apr. 18, 2000, and U.S. provisional patent application Ser. No. 60/185,182, filed on Feb. 25, 2000, the disclosures of which are hereby incorporated by reference herein.

This application is also related to the following commonly-owned, co-pending United States patent applications filed on the same date as the present application, the disclosure of each of which is hereby incorporated by reference herein: 1) "Targeted Television Content Display," by Malcolm Slaney et al.; 2) "Display of Targeted Content Within a Television Program," by Malcolm Slaney et al.; 3) "Characterizing a Content Display Observer," by Malcolm Slaney et al.; and 4) "Detection of Content Display Observers With Prevention of Unauthorized Access to Identification Signal," by Malcolm Slaney et al.

BACKGROUND OF THE INVENTION

1. Field of the Invention

This invention relates generally to displaying content to content observers such as television viewers and, in particular, to displaying targeted content to content observers. More particularly, the invention relates to the use of an auction system for selecting content—and, even more particularly, targeted content—for display to content observers.

2. Related Art

The direct marketing industry has demonstrated the value in being able to target content (in the case of direct marketing, typically an advertisement) to a particular type of consumer. A targeted advertisement increases the likelihood of stimulating a consumer's interest in a product or service. For example, the message that would be used effectively to sell a car to a family with children that places a high value on safety is clearly very different from the message that would be used effectively to sell the same car to a recent college graduate who is looking forward to the chance to spread their wings. Further, particular advertisers may desire to communicate only with particular consumers. For example, a manufacturer of feminine hygiene products may highly value the ability to show their commercial to a female, but will place little or no value on the ability to show the commercial to an elderly male viewer. Similarly, a skateboard manufacturer would love to show their advertisement to teens, but has little interest in showing the advertisement to viewers of other ages.

Like other content providers, content providers that deliver content for display on television (e.g., broadcast stations, cable operators) have an interest in delivering and displaying targeted content to television viewers. Television content providers desire to exploit the value of their product. Their primary vehicle for doing so is selling advertising time. Delivering custom advertisements targeted to particular viewers can increase the value of that advertising time. In many ways delivering custom television broadcast content is similar to the airline industry's efforts at yield management. Content providers (e.g., advertisers) have a period of time (e.g., 30 second commercial break in a television program) to present their message and if they don't extract the maximum value from this time then it is lost forever. Currently, television advertisers seek to target their advertising by picking appropriate television programs during which to show their advertisements. However, it is desirable to enable a more precise form of targeted marketing for television advertising and, more generally, to enable custom content delivery for use in display of television content (e.g., television broadcasts, on-demand television content delivery).

Access to advertising space can be distributed by auction. (See, for example, the advertisement auction services provided by adauction.com, as described, for example, at www.adauction.com.) Distributing access to advertising space by auction can enable those advertisers who most highly value particular access to advertising space to obtain that access. However, advertisement auctions have not enabled advertising space to be auctioned in real time as the advertising space becomes available for display of an advertisement. Nor have advertisement auctions enabled an advertising space to be auctioned off piecemeal to different advertisers who will present different advertisements within that space, i.e., advertisements auctions have not been used to enable targeted advertising. For example, advertisement auctions have not been used to enable different television advertisements to be presented to different television viewers at the same time.

SUMMARY OF THE INVENTION

The invention enables and/or facilitates the display of personalized content to content observers by content providers (e.g., advertisers) who disseminate content over a network. In particular, the invention can be used to enable the display of targeted content to television viewers. The invention can be implemented for use with a television network by having a set top box (or similar television control device) with processing capability connected to each of multiple televisions on the network. A large variety of targeted content can be stored on data storage devices at each location of a content display device (e.g., data storage devices associated with television set top boxes). The invention enables identification of the viewer(s) viewing the content display device at a particular time and selects targeted content for display based on a determination of content appropriate for display to those viewer(s) in accordance with a criterion based on the identity and/or a characteristic of the viewer(s). The invention can track the viewing habits of each viewer. The decisions regarding which of the variety of targeted content to display to each viewer can be based on the viewer's viewing habits. The invention can be implemented to make real-time determinations regarding which of multiple versions of content to display to particular content observer(s). Since an identification of the viewer(s) viewing the content display device at a particular time is made, the invention enables more accurate targeting of content than previous systems for delivering and displaying targeted content to observers. Additionally, the local storage and decision-making overcomes limitations of previous systems for delivering and displaying targeted content to observers. The invention can be used to sell the attention of each content observer to the content provider that places the highest value on that content observer's attention. In particular, the invention can advantageously be implemented so that the value paid by content providers over time is maximized.

In one embodiment of the invention, targeted content can be selected for display on a content display device at a content display site by i) receiving a plurality of sets of targeted content at the content display site; ii) receiving instructions and/or data regarding the value to a content provider and/or the value to a content observer of displaying a set of targeted content to the content observer and/or to the content display site; and iii) processing instructions and/or data for selecting one of the plurality of sets of targeted content for display to the content observer in accordance with a criterion based on the values associated with the plurality of sets of targeted content.

As indicated above, the invention can be implemented so that the value paid by content providers over time is maximized. This can be done, for example, by progressively scheduling for display sets of content in decreasing order of the value associated with display of the set of targeted content. In order to maximize the value paid by content providers over time, it may not be desirable to select the highest valued content for display during a particular content display opportunity. The invention enables consideration of constraints imposed by content providers on the display of their content (e.g., the content cannot be displayed more than a specified number of times or after a particular calendar date), in addition to the values specified by the content providers for display of their content, in order to maximize the value paid by content providers over time.

The value of displaying a set of targeted content can be based on when the set of targeted content is to be displayed. For example, the value can be based on the number of times that the set of targeted content has previously been displayed at a particular content display site and/or to a particular content observer, the frequency with which a set of targeted content has been displayed at a particular content display site and/or to a particular content observer, an absolute time or times at which the set of targeted content is to be displayed, a range of times during which the set of targeted content is to be displayed, the temporal proximity of the prospective display of the set of targeted content to the display of other content (e.g., to another display of the same set of targeted content, to the display of content of a particular type, to the display of another particular set of content), and/or whether one or more of a plurality of possible content observation channels will also display the set of targeted content at the same time.

The value of displaying a set of targeted content can also be based on the identity and/or a characteristic of a content observer to whom it is desired to display a set of targeted content. For example, the value can be based on the number, the identity and/or a characteristic of a plurality of content observers to whom it is desired to display a set of targeted content. The value of displaying a set of targeted content can also be based on the identity and/or a characteristic of a content display site at which it is desired to display a set of targeted content.

The instructions and/or data for selecting one of the plurality of sets of targeted content for display can include instructions and/or data regarding when a set of targeted content can or cannot be displayed. Such instructions and/or data can include, for example, instructions and/or data concerning the above-discussed factors upon which the value of displaying a set of targeted content can be based.

The invention can be used generally to display any type of targeted content, such as, for example, targeted advertisements during commercial breaks during television programs or targeted content (e.g., targeted product placements) within a television program. In the former case, the invention can be implemented so that the targeted content continues to be shown even if a viewer changes the channel.

The invention can be implemented so that a viewer can indicate a response to display of a set of targeted content, such as, for example, a level of satisfaction with the display of the set of targeted content, a desire to view or not view the display of the set of targeted content again or a desire to view the display of a set of content that is related to the displayed set of targeted content. This aspect of the invention can be implemented to enable the viewer to indicate the response to the display of the content using voice recognition apparatus to enable the viewer to use spoken commands, visual recognition apparatus for discerning the response to the display of the content based on visual recognition of viewer motion or appearance, and/or a tactile input device. The invention can be implemented so that compensation from a content provider for display of the content provider's set of targeted content is dependent on the viewer response to display of the set of targeted content.

DETAILED DESCRIPTION OF THE INVENTION

Figure 1:
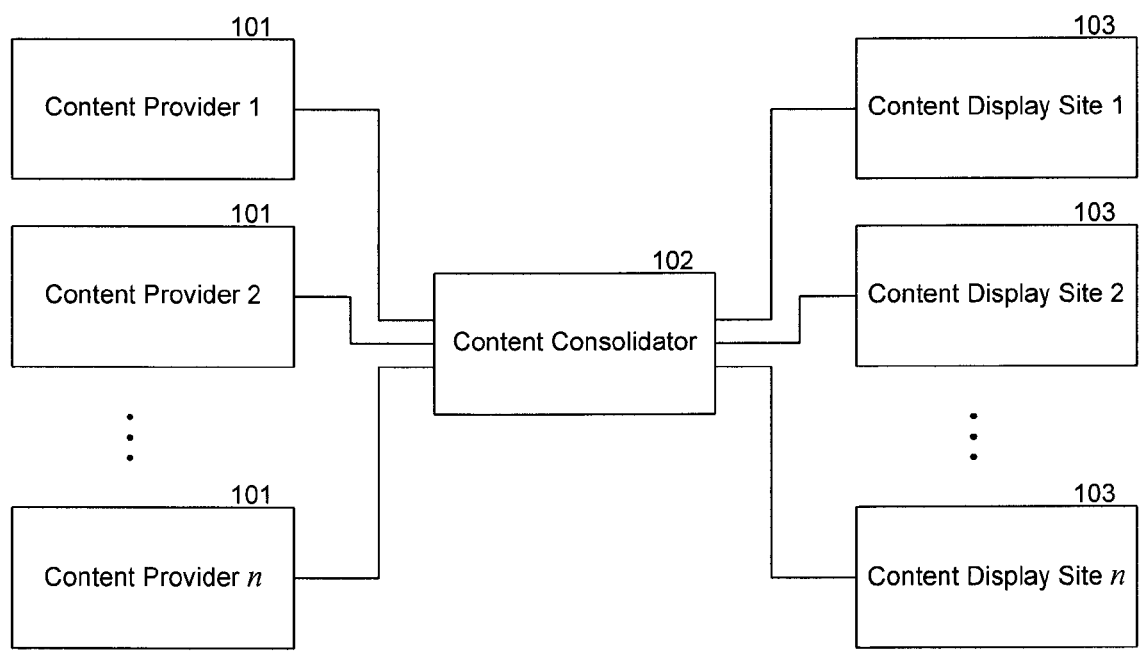
FIG. 1 is a block diagram of a content distribution network with which the invention can be used.

The invention enables content providers (e.g., advertisers) to effect the display of content (e.g., advertisements) at each of multiple content display sites of a content distribution network that is targeted to content observer(s) at that content display site. In particular, the invention can be used to enable content providers to effect the display of content at each of multiple television viewing locations (e.g., residences such as homes and apartments) of a television network (e.g., conventional television networks, cable television networks, digital television networks, satellite television networks) that is targeted to television viewer(s) at that television viewing location. However, aspects of the invention can have broader applicability and can be used in effecting targeted content displays to content observers at content display sites of any appropriate content distribution network, e.g., a computer network such as the Internet (and, in particular, the World Wide Web portion of the Internet), a radio network, a network of real-time changeable billboard displays). Further, though it is anticipated that the invention will often be used to effect targeted display of visual (e.g., video, text), audio or audiovisual content, the invention can be used to effect targeted display of any type of content, including content that is sensed, in whole or in part, by taste, smell or touch.

The invention enhances a system for displaying content to content observers (e.g., television viewers) by enabling each content provider (e.g., advertiser) to specify the value to the content provider of displaying their content during a content display opportunity (e.g., a commercial break, a product placement opportunity) and determining which content to display based on the values specified by the content providers. (The invention can also be implemented so that a content observer can specify the value(s) to the content observer of displaying one or more sets of content.) In particular, the invention can advantageously be used to enhance a system for displaying targeted content to content observers by enabling each content provider to specify the value to the content provider of displaying their targeted content to particular content observer(s) and/or at particular content display sites. The invention can advantageously be implemented by providing processing capability at each content display site (e.g., including processing capability in a set top box associated with a television) so that a determination can be made at each content display site regarding which of multiple sets of content transmitted to that content display site to display. In particular, the invention can be implemented so that the selection of content to display occurs in real-time as a content display opportunity becomes available for the display of content. It is contemplated that the invention will be particularly useful, for example, in enabling auction of advertising time during commercial breaks in television programs or auctioning the right to display content (e.g., a product placement) during a television program and, in particular, to enhancing a system for providing targeted content during such content display opportunities.

Further, the invention can advantageously be implemented so that, for each content display opportunity, a set of content is selected for display to content observer(s) at a content display site in accordance with the goal of maximizing the value (i.e., compensation) obtained from content provider(s) for the content display(s). For example, the invention can be implemented so that value is maximized for each content display opportunity. The invention can also be implemented so that value is maximized for a set of content display opportunities. This can be desirable, for example, when different sets of content have different values and allowable display times associated therewith, since, in order to maximize the value paid by content providers over time, it may not be desirable to select the highest valued set of content for display during a particular content display opportunity. The invention enables consideration of constraints imposed by content providers on the display of their content, in addition to the values specified by the content providers for display of their content, in order to maximize the value paid by content providers over time.

The invention can not only enable a content observer's attention to be sold to the highest bidder, but can also be used to ensure other desirable properties of a particular content display. For example, the invention can be implemented to ensure or increase the probability that a particular content display is not shown again to the same content observer too quickly after a previous showing (which may otherwise "waste" a showing of the content display). The invention can also be implemented to ensure or increase the probability that a particular content display is not shown too many times (i.e., can prevent overexposure of the content display). The invention can also be implemented to ensure or increase the probability that each content observer sees a particular content display at least a predetermined number of times. The invention can also be implemented to ensure or increase the probability that all content observers eventually see a particular content display. The invention can also be implemented to ensure or increase the probability that particular content observer(s) do not see a particular content display (e.g., don't display the content when parents are in the room). The invention can also be implemented to ensure or increase the probability that the same content display is being displayed on all possible display channels at the same time.

FIG. 1 is a block diagram of a content distribution network with which the invention can be used. Content providers 101 each provide one or more sets of "auctionable content," each of which has associated therewith instructions and/or data indicating a value to a content provider of displaying the set of content to particular content observer(s) and/or at particular content display site(s). In the system illustrated in FIG. 1, the sets of auctionable content are transmitted to a content consolidator 102 which gathers sets of auctionable content from the content providers 101 and transmits sets of auctionable content to content display sites 103. For example, when the invention is used to effect the display of auctionable television content, the content consolidator 102 can be embodied by a cable television system headend. Or, for example, when the invention is used to effect the display of auctionable content on content display devices that are part of a computer network, the content consolidator 102 can be embodied by one or more server computers (e.g., one or more server computers used to implement a Web site). The invention can be implemented so that the content consolidator 102 transmits multiple sets of auctionable content to a content display site 103 that can potentially be displayed during a content display opportunity (e.g., a commercial break during a television program or between television programs, a product placement opportunity within a television program) at the content display site 103. At the time of the content display opportunity at the content display site 103, an appropriate set of content is selected (as described further below) at the content display site 103 for display to content observer(s) at that content display site 103 during the content display opportunity. Alternatively, the invention can be implemented so that the content consolidator 102 selects an appropriate set of content for display to content observer(s) at a content display site 103 and transmits only the selected set of content to the content display site 103 for display at the content display site 103 during a content display opportunity. (Other content can also be provided to the content display sites 103, e.g., television programs during or within which auctionable content is to be displayed.) The content distribution network shown in FIG. 1 is merely illustrative of a manner in which the invention can be used; those skilled in the art will readily appreciate, in view of the description herein, that the invention can be used with other content distribution systems.

The above-referenced United States patent application (as indicated above, the disclosure of that application is incorporated by reference herein) describes an invention which enables content providers (e.g., advertisers) to effect the display of targeted content (e.g., advertisements) provided over a network for display to content observers (and, in particular, to enable content providers to display targeted content to television viewers). According to that invention, sets of targeted content can be stored in a data storage device associated with a content display system (e.g., a data storage device that is operably connected to, or integrated with, a set top box that is itself operably connected to, or integrated with, a television). The local data storage is used to store a large inventory of sets of targeted content that may potentially be deemed sufficiently valuable (e.g., of sufficient interest) to warrant display to content observer(s) at that content display site. One or more sets of targeted content are selected from this local inventory for display to content observer(s) observing the content display device at the content display site at the time of a content display opportunity. Those skilled in the art will readily appreciate that all of the mechanisms for acquiring, storing, managing and displaying targeted content described in that patent application can be used with the instant invention.

The above-referenced United States patent application (as indicated above, the disclosure of that application is incorporated by reference herein) describes an invention which enables the display of targeted content (e.g., targeted product placements) within a television program to displaying such targeted content based on the identity and/or a characteristic of a television viewer who is determined to be viewing a television at the time that the targeted content is to be displayed on the television. The above-referenced United States patent application (as indicated above, the disclosure of that application is incorporated by reference herein) describes an invention which enables identification of content observers to facilitate the display of targeted content to those content observers. The above-referenced United States patent application (as indicated above, the disclosure of that application is incorporated by reference herein) describes an invention that prevents unauthorized access to data produced as part of identification of a content observer. As will be readily appreciated by those skilled in the art, the methods and apparatus described in those patent applications can also be used together with the invention described herein.

Figure 2:
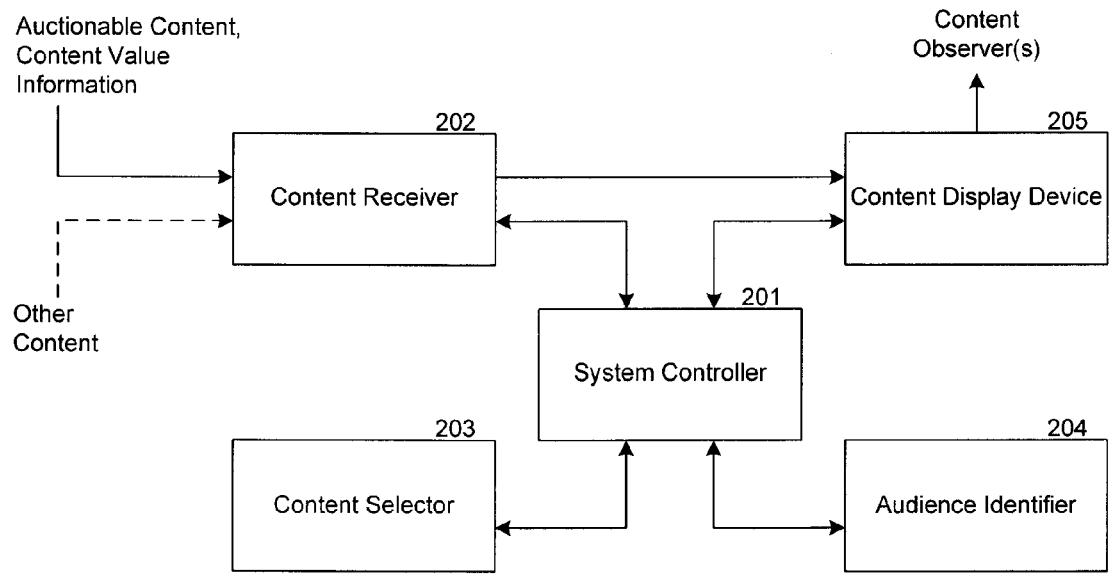
FIG. 2 is a block diagram of a system, according to an embodiment of the invention, for use at a content display site for displaying auctionable content on a content display device at the content display site.

FIG. 2 is a block diagram of a system, according to an embodiment of the invention, for use at a content display site for displaying auctionable content on a content display device at the content display site. The system includes a system controller 201, a content receiver 202, a content selector 203, an audience identifier 204 and a content display device 205. The system shown in FIG. 2 (as well as the systems according to the invention shown in FIGS. 3 through 8, described below) can be implemented (except for the content display device 205), for example, in an appropriately constructed television set top box including the functionality of such system as described herein. Such a television set top box (or other apparatus for embodying the systems of FIGS. 2 through 8) can readily be constructed by those of skill in the art in view of the description herein. The system controller 201 mediates and controls interaction among the other components of the system (the system could, alternatively, be implemented so that the functionality of the system controller 201 is distributed among one or more of the other components of the system shown in FIG. 2). Multiple sets of auctionable content are received at the content display site by the content receiver 201. (Alternatively, as indicated above, an appropriate set of auctionable content can be selected, in accordance with the principles of the invention, at a location remote from the content display site and transmitted to the content display site for display during a content display opportunity.) Other content can also, but need not necessarily, be received by the content receiver 201. (It is anticipated that the invention will often be used to effect the display of auctionable content during or within the display of other, "primary" content; however, the invention can also be used to produce auctionable "primary" content displays.) The content receiver 201 also receives information regarding the desired audience for each set of auctionable content (as described in more detail below). (This information is not transmitted to the content display site if the set of auctionable content is selected at a location remote from the content display site.) When a content display opportunity arises, the audience identifier 204 can identify the content observer(s) viewing the content display device 205 at that time (as described in more detail below) and/or can identify the content display site. (Alternatively, the audience identifier 204 can have previously identified the content display site and/or likely content observer(s) at the content display site, the latter based on information previously obtained regarding content observer(s) at the content display site.) The system controller 201 communicates to the content selector 203 information regarding the identity and/or a characteristic of the content observer(s) and/or the content display site, as well as information regarding the desired audience (i.e., content observer(s) and/or content display site) for each set of auctionable content that can potentially be displayed during the content display opportunity. The content selector 203 selects one of the sets of auctionable content for display to the content observer(s) during the content display opportunity. In particular, an important aspect of the invention is that the invention can enable selection of a set of auctionable content in accordance with a criterion based on the identity and/or a characteristic of the content observer(s) viewing the content display device 205 at the time of the content display opportunity (as described in more detail below). The selected set of auctionable content is provided to the content display device 205 for generation of a display of that set of content.

A content provider can specify a desired audience for its content by specifying the locations of content display sites (e.g., household addresses within a specified geographic region) at which the content provider would like its content displayed or by indicating the demographics of the content observers that the content provider is trying to reach. A content provider can also specify a desired audience for its content by identifying particular individuals or small groups of individuals (e.g., families) to whom to display its content, and/or particular content display sites (e.g., particular household addresses) at which to display its content; however, it is anticipated that such an approach will typically be more cumbersome than is desirable. Content display site locations can be ascertained by a content provider in any appropriate manner. For example, when the invention enables display of targeted television content, content display site locations can be recorded by installers who install set top boxes in accordance with the invention at content display sites (e.g., households). This information can be then be passed on to content providers. Demographic data can be obtained, for example, directly from content observers (e.g., by implementing a television set top box in accordance with the invention and providing an appropriate input device that enables a television viewer to specify demographic information regarding themselves and/or other potential television viewers at the television viewing location) or obtained from a direct marketing company, such as Donnelley Marketing of Omaha, Nebr.

Figure 3:
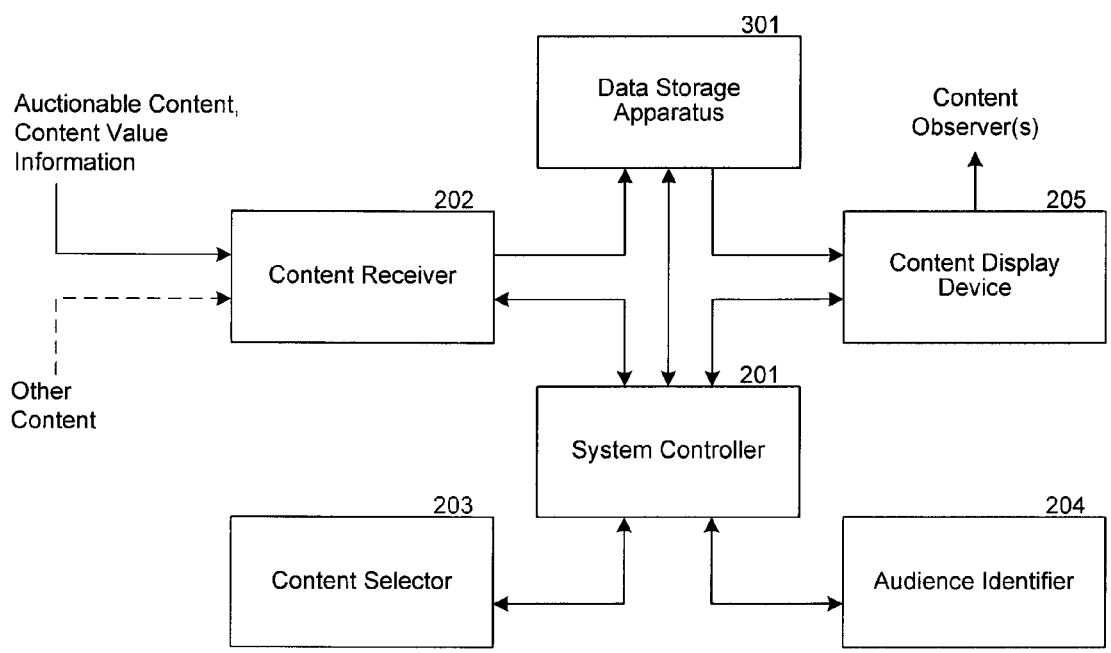
FIG. 3 is a block diagram of a system, according to another embodiment of the invention, for use at a content display site for displaying auctionable content on a content display device at the content display site, in which sets of auctionable content received at the content display site are stored in a data storage device located at the content display site.

The invention can advantageously be implemented so that different sets of auctionable content (e.g., different advertisements, different versions of an advertisement) are stored in a data storage device associated with a content display system or device (e.g., television) that will be used to display one or more of the sets of auctionable content. (For convenience, such a content display system or device is usually referred to herein simply as a content display device.) For example, when the invention is implemented to enable display of auctionable television content, sets of auctionable content can be stored on a data storage device that is operably connected to, or integrated with, a set top box that is itself operably connected to, or integrated with, the television. The invention can make use of such "local" data storage to store a large inventory of sets of auctionable content that may potentially be deemed sufficiently valuable (e.g., of sufficient interest) to warrant display to content observer(s) at that content display site. The invention can be implemented so that all available sets of auctionable content are transmitted to all content display sites or so that only sets of auctionable content which it has been determined, based on the content display site location and/or the demographics of the content observer(s) at the content display site, can potentially be displayed at a content display site are transmitted to the content display site. As indicated above and discussed in more detail below, one or more sets of auctionable content are selected from this local inventory for display to content observer(s) in accordance with bids (and, perhaps, one or more other criteria) specified by content providers and/or the content observer(s). Data regarding bids by content providers for display of a set of content that they provide and instructions for using the bids, together with other information (as necessary or desirable), to determine when and to whom to show each set of content, can also be stored on the data storage device. FIG. 3 is a block diagram of a system, according to another embodiment of the invention, for use at a content display site for displaying auctionable content on the content display device 205 at the content display site, in which sets of auctionable content received at the content display site are stored in a data storage device 301 located at the content display site.

The invention can be implemented so that sets of auctionable content are delivered to a content display site so as to reduce or eliminate interference with a content observer's interaction with the content display device at the content display site. For example, sets of auctionable content can be delivered at times when the content display device is being used little or not at all (e.g., at night). Or, for some implementations of the invention, sets of auctionable content can be delivered via a data path that is different from a data path over which the content display device is receiving other content and/or other data. For example, when the invention is implemented to enable display of auctionable television content, sets of auctionable content can be delivered to a television viewing location via an IP connection during times at which data for a current television broadcast is also being received by the television.

Sets of auctionable content can either be "pushed" or "pulled" to a content display site. For example, when the invention is implemented to enable display of auctionable content during television programs, in a "broadcast" mode the auctionable content and corresponding display instructions can be sent continuously ("pushed") to a television set top box by a cable television system's headend. When the set top box is otherwise unoccupied (e.g., when the set top box is not receiving signals for a television broadcast), the set top box can be tuned to the channel over which the auctionable content is being broadcast to receive as many sets of auctionable content as can be received during the available time and/or as can be stored by an associated data storage device. Alternatively, the set top box can "pull" (i.e., request delivery of) auctionable content over an alternate pathway (such as a cable modem). When the sets of auctionable content (e.g., advertisements) are "pulled," the invention can be implemented so that only particular sets of auctionable content are obtained, in accordance with the identity and/or characteristic(s) of the content display site location and/or the demographics of the content observer(s) at the content display site. This can be desirable to efficiently use the data storage capacity at the content display site.

Figure 4:
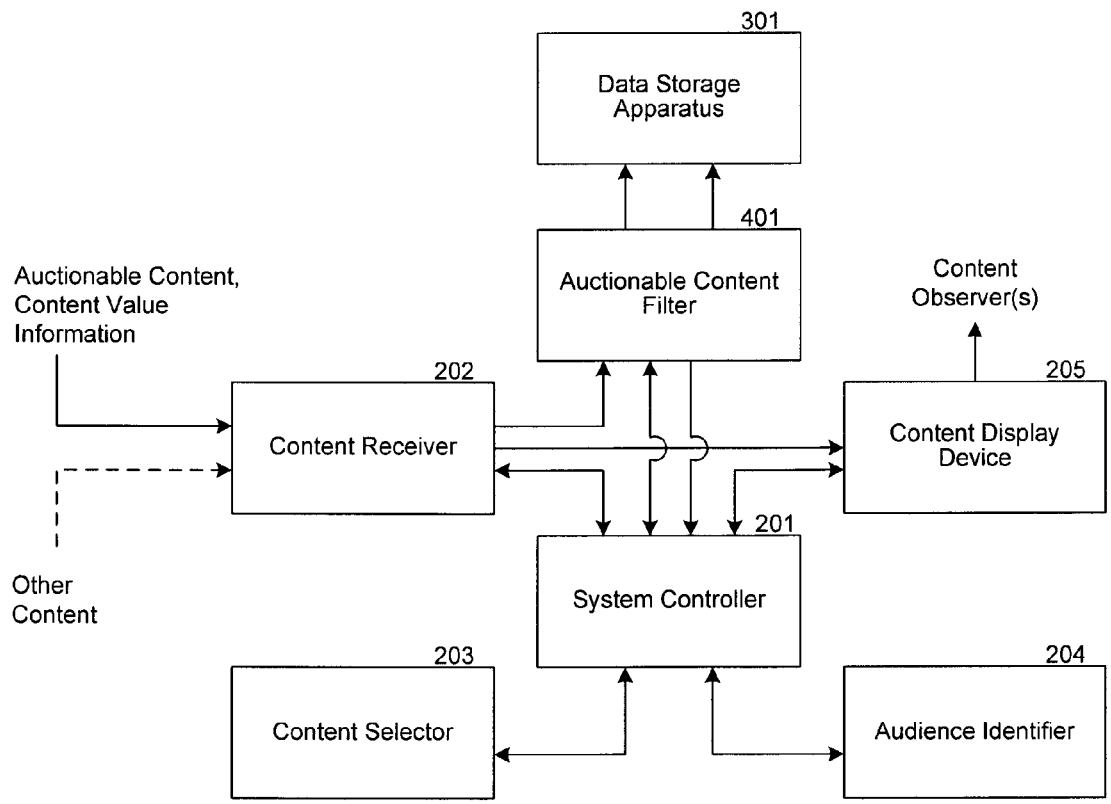
FIG. 4 is a block diagram of a system, according to yet another embodiment of the invention, for use at a content display site for displaying auctionable content on a content display device at the content display site, in which sets of auctionable content received at the content display site must successfully pass through a auctionable content filter before being stored in a data storage device located at the content display site.

To conserve space in a data storage device used to store sets of auctionable content at a content display site, one or more filters can be used to prevent the storage of received sets of auctionable content that satisfy (or don't satisfy, depending upon the implementation) one or more criteria. For example, sets of auctionable content that can be identified as directed to children can be excluded from storage in the data storage device if the content display site is known to be a household without children. Or, conversely, sets of auctionable content that can be identified as unsuitable for children (e.g., content that is sexually explicit or excessively violent) can be excluded from storage in the data storage device if the content display site is known to be a household with children. Such filtering can be accomplished, for example, by evaluating data describing the content (e.g., identifies the subject matter of the content) that often accompanies the data representing the content itself. FIG. 4 is a block diagram of a system, according to yet another embodiment of the invention, for use at a content display site for displaying auctionable content on the content display device 205 at the content display site, in which sets of auctionable content received at the content display site must successfully pass through an auctionable content filter 401 before being stored in the data storage device 301 located at the content display site.

Other methods can also be used to conserve space in a data storage device used to stored sets of auctionable content at a content display site. For example, a set of auctionable content can be deleted from the data storage device after having been displayed a predetermined number of times or after passage of a predetermined duration of time since the set of auctionable content was received at the content display site.

In addition to receiving sets of auctionable content, a content display site can receive instructions and/or data for use in determining whether to display a set of auctionable content during a particular content display opportunity. These instructions and/or data may be delivered to the content display site together with corresponding set(s) of content. In accordance with the invention, the instructions and/or data for determining whether to display a set of auctionable content can include instructions and/or data indicating the "value" (i.e., what a content provider is willing to pay for display) of a corresponding set of auctionable content, and instructions and/or data using the values, together with other information (as necessary or desirable), to determine when and to whom to show each set of content. Instructions and/or data for determining whether to display a set of auctionable content can, and often will, depend on the identit(ies) and/or characteristic(s) of the content observer(s) to whom, and/or the content display site at which, a set of auctionable content is to be shown. In particular, the value of a set of auctionable content can depend on the identit(ies) and/or characteristic(s) of the content observer(s) to whom, and/or the content display site at which, a set of targeted content is to be shown. For example, the value of a set of auctionable content can depend on the degree to which the age, gender, income and/or interests of the content observer(s) at a content display site matches the age, gender, income and/or interests of content observers to whom a content provider desires to appeal with the set of auctionable content. As an illustration, if a content display device is being watched by a content observer who is known to be interested in sports, an advertisement for an upcoming broadcast of a sporting event or an advertisement for sports equipment can be assigned a high value when evaluated for potential display on that content display device. As can readily be appreciated, the possibilities for characterizing content observers and assigning value to the display of a set of content based on those characterizations are nearly endless. The invention can advantageously be implemented so that just before each time at which a set of auctionable content can be displayed, a determination is made regarding who is observing a content display device and a set of auctionable content is chosen for display on the content display device in accordance with the values placed by content providers on sets of auctionable content that can be chosen for display and, in particular, display of those sets of auctionable content to the content observer(s) observing the content display device at that time. In general, the set of auctionable content that is displayed is the one for which the corresponding content provider has made the highest bid. However, this may not always be the case, as is made clearer by the description and examples below.

The instructions and/or data for determining whether to display a set of targeted content can also include instructions and/or data regarding when and/or when not to display a set of targeted content. For example, a content provider can specify particular times or ranges of times at which a set of targeted content can or cannot be displayed. These times can be absolute (e.g., a particular clock time on a particular day, a particular day or days during a week, after or before a specified date) or relative (e.g., not before or after a specified duration of time since another event, such as another display of the same content; not before, after or during display of a particular kind or set of content). A content provider can also specify a maximum number of times that a set of targeted content can be displayed or a maximum frequency that a set of targeted content can be displayed (especially at a particular content display site and/or to particular content observer(s)). A content provider can also specify constraints on the temporal proximity of display of a set of targeted content to the display of other content (e.g., the temporal proximity of display of a set of targeted content to another display of the same set of targeted content, the temporal proximity of display of a set of targeted content to the display of content of a particular type, the temporal proximity of display of a set of targeted content to the display of another particular set of content, the temporal proximity of display of a set of content to the display of other content at a particular content display site and/or to a particular content observer). For example, a content provider may specify that their content should only be displayed at certain times of the day, not during particular television programs, or not within a specified number of hours of previous display of the content to the same content observer. As an illustration of such instructions, when the invention is implemented to enable display of targeted advertisements during television programs, the instructions might be of the form "only display this advertisement during 'Ally McBeal,'" or "never play this advertisement during a wrestling show."

The conditions regarding when and when not to display a set of targeted content can be specified as hard constraints regarding the content display that are not to be relaxed when making determinations regarding which set of targeted content to display at a content display site. In determining which of multiple sets of targeted content to display at a particular time to particular content observer(s), all sets of targeted content having a hard constraint associated therewith that specifies that the set of targeted content is not to be shown to a content observer at that time, or to those content observer(s), is eliminated. This may be the case, for example, when a set of targeted content has been displayed recently to the content observer(s), has already been shown too many times to the content observer(s), or has been prohibited from being shown during a current program. The invention is preferably implemented so as not to violate the hard constraints because displaying a set of targeted content in violation of such a constraint may damage the content provider's reputation, dilute the content provider's message or otherwise impair the content provider's attempt to communicate successfully with the content observer(s).

In a simple implementation of the invention, content providers indicate what they are willing to pay for displaying their content to viewers of particular ages and/or genders. For example, a manufacturer of computer games may be willing to pay lots of money to show their content to a 12-18 year old male, a little less money to show their content to a 12-18 year old female, and no money at all to show their content to a 35-49 year old woman. On the other hand, a frozen entree seller may be willing to pay a lot to show their message to the 35-49 year old woman and nothing at all for the teenagers. The frozen entree seller may be willing to pay even more if it was known that the woman observing the content display device was a mother with kids. Other content providers may be willing to pay more for content observers that observe a certain program (because watching that program gives a relatively highly probable indication of those content observers' interests or tastes). Given a content observer's "identity" (i.e., a description of characteristics of the content observer), the value in displaying each available set of content to the content observer(s) in front of a content display device can be determined. As indicated above, the invention can be implemented so that the set of content to which the highest value has been attributed is chosen for display to the content observers (subject to satisfaction of hard constraints regarding the sets of content) observing a content display device at each targeted content display opportunity.

The invention can be implemented so that the value paid by content providers over time is maximized. Maximizing the value paid by content providers over time is one reason why the set of content for which the corresponding content provider has made the highest bid may not be the set of content that is chosen for display during a particular content display opportunity. For example, a first content provider may be willing to pay for up to 20 showings of its content at one cent per content observer, while a second content provider is willing to pay for up to 20 showings of its content at two cents per content observer. Without other constraints, the second content provider's content will always be chosen for display over the content of the first content provider. However, if, for example, a contract with the first content provider for displaying the first content provider's content only runs for one more day, while a similar contract with the second content provider runs for another month, the decision-making environment has been changed in a manner that makes the decision regarding which content to display less clearcut. Since it is likely that 20 time blocks for showing the second content provider's content can readily be found later in the month, revenue from the content providers can be maximized by showing the one cent content now before the contract with the first content provider expires, knowing that there is still time later for completing all of the allowed showings of the two cent content.

The following example illustrates how the invention can be used to schedule display of content from different content providers having different content display arrangements in a manner that maximizes compensation from the available content display opportunities. In the example, it is assumed that it is known from past viewing that a content observer will have one block of time per day to observe targeted content. Three content providers have provided bids specifying the value placed on the display of their content, the maximum number of times their content can be displayed, and the latest time at which their content can be displayed, as shown in Table 1:

TABLE 1

| Content Provider | Value | Max showings | Latest showing |
| --- | --- | --- | --- |
| 1 | 1 cent | 10 times | 3 days from now |
| 2 | 2 cents | 5 times | 10 days from now |
| 3 | 3 cents | 2 times | 8 days from now |

Starting with the highest value set of content (three cents), a schedule can begin to be filled in by scheduling the display of the highest value set of content for the latest times at which those displays can occur:

$$\frac{1\ 2\ 3\ 4\ 5\ 6\ 7\ 8\ 9\ 10}{\quad\quad\quad\quad\quad\quad\quad 3\ 3\quad\quad}$$

Next, the schedule is further filled in by scheduling the display of the next highest value set of content (two cents) for the latest times at which those displays can occur, in view of the previously scheduled sets of content:

$$\frac{1\ 2\ 3\ 4\ 5\ 6\ 7\ 8\ 9\ 10}{\quad\quad\quad\quad 2\ 2\ 2\ 3\ 3\ 2\ 2\quad}$$

Finally, the remainder of the sets of content (one cent) are scheduled in the remaining blocks of time:

$$\frac{1\ 2\ 3\ 4\ 5\ 6\ 7\ 8\ 9\ 10}{1\ 1\ 1\ 2\ 2\ 2\ 3\ 3\ 2\ 2}$$

Use of the above procedure ensures that all high-value sets of content are displayed while still filling all available blocks of time.

After a period of time (e.g., several weeks) during which each content observer's observation habits are monitored, it is possible to glean a significant amount of information about those habits. For example, the number of hours of television a television viewer watches per day, the times of day a viewer watches television, and the channels that a viewer typically watches can be determined with some degree of certainty from the viewer's past television viewing. (To protect content observers' privacy, the invention can be implemented so that this information is not transmitted from the content display site and is used only at the content display site for the purposes of implementing the invention.) The information regarding observation history can be used to predict how many blocks of time will be available for display of content to each content observer in the future, as well as other characteristics of those blocks of time (e.g., when the blocks of time will occur, during what type of program the blocks of time will occur). For example, with a sufficiently detailed viewing history, it may be predicted that a particular television viewers will watch X hours of science fiction programs and Y hours of comedy programs. These projections regarding viewing habits can be used as part of the auction process to maximize the revenue obtained from the content displays, particularly when (as will typically be the case) different content providers have different arrangements regarding the price(s) to be paid for displaying their content, the frequency of display of their content, and the duration of time over which their content can be displayed, as discussed above.

It can be desirable to implement the invention so that the predictions of future content observer behavior are conservative, i.e., allow for some variation in content observer behavior to accommodate unusual content observer behavior (e.g., the content observer decides to leave town for a weekend). The invention can therefore be implemented so that predictions of future content observer behavior are modified in accordance with the variance in past content observer behavior. This can be done to ensure or increase the probability that the method used to select sets of content for each block of viewing time will result in the viewing of content that maximizes the revenue generated from the content displays. For example, a television viewer may on average watch 3 hours of science fiction a week, but, in some weeks, watch no science fiction. The probabilities regarding viewer viewing habits (e.g., the viewer sometimes watches 0 hours of science fiction) can be used to bias the predictions of future viewing habits so that high value content is shown earlier than would otherwise be the case, thus increasing the likelihood that high value content will be shown as often as allowed by the content provider.

The invention can also be implemented so that the presence of multiple content observers at a content display site (and, in particular, the presence of multiple content observers at the time of a content display opportunity) is detected (and salient characteristics of those content observers determined). The content providers' bids can be dependent on the number and characteristics of the content observers present at a content display site.

For example, if a content provider has agreed to pay an amount W for the attention of a type X content observer and an amount Y for the attention of a type Z content observer, then the invention can be implemented so that the bid from that content provider when two type X content observers and one type Z content observer are present is 2W+Y. (Or, a discount can be given when multiple content observers are present, i.e., the amount of the bid is between 2W+Y and the greater of W and Y.)

The invention can also be implemented so that a content observer can also enter bid(s) for control of the content display during particular content display opportunities. For example, a television viewer may desire to view a soothing beach scene rather than an advertisement. In this respect, the content observer can be treated just like another content provider, the content observer specifying the same bid parameters as any other content provider which are used in the same way to determine whether or not the content observer's desired content is displayed.

The determination of the identity and/or characteristic(s) of a content observer observing a content display device at any given time can be made using data obtained in a variety of ways. (The identity and/or characteristic(s) of the content observer(s) observing the content display device at a particular time can be used to determine which set of targeted content to display at that time.) Ways of determining the identity and/or characteristic(s) of a content observer in the vicinity of a content display device (a content observer in the vicinity of the content display device is presumed to be observing the content display device) are described in detail in the above-referenced United States patent applications (as indicated above, the disclosure of each of those applications is incorporated by reference herein). The methods and apparatus for determining the identity and/or characteristic(s) of a content observer described herein and in the United States patent applications can be used both for identifying content observer(s) present in the vicinity of a content display device at a particular time (e.g., at, or just prior to, the time of a content display opportunity, so that appropriate auctionable content can be displayed to the content observer(s) during that content display opportunity) and for generally identifying content observer(s) who have been present in the vicinity of a content display device at a content display site during previous content displays (and are therefore likely to be present in the vicinity of the content display device during a present or future content display opportunity, which information can be used to select auctionable content for display at the content display site during such content display opportunity).

For example, characteristic(s) of the observation of content at a content display site (e.g., the type of content displayed and/or the manner of display of content) can be used to enable determination of the identity and/or a characteristic of a content observer at the content display site. Further, information about the display environment can be combined with information about the content observer's habits in observing content to identify a content observer. For example, information obtained by one or more devices that sense one or more physical characteristics of the people present in the vicinity of a content display device at the content display site (e.g., one or more visual data acquisition devices, such as camera(s), and/or one or more audio data acquisition devices, such as microphone(s)) can be combined with information regarding the content observation behavior at the content display site to identify content observer(s) at the content display site. Demographic information regarding possible content observers at a content display site can also be combined with information regarding the content observation behavior at the content display site to identify content observer(s) at the content display site. All three types of information (content observation behavior, physical characteristics of content observers, demographic information regarding possible content observers) can also be combined to enable identification of content observers at the content display site, enhancing the accuracy of the identification. The invention enables physical characteristics of content observers at a content display site and/or demographic information regarding possible content observers at the content display site to be connected with information regarding the observation habits of a content observer to enable the identity of the content observer to be known with an acceptable degree of certainty.

The display of content at a content display site can be monitored so that one or more characteristics of the observation of content at the content display site can be determined for use in identifying content observer(s) who have observed particular content or observed content in a particular manner. When the invention is implemented to enable display of targeted content by a television, for example, a set top box can be used to identify and store data regarding which channel is being viewed and how often, and to which other channels each viewer changes the channel. Demographic information associated with such content observation characteristics can be used to characterize content observer(s) in the vicinity of the content display device (who are presumed to be watching the content display device) at the time the content observation occurred.

For example, when the invention is implemented to enable the display of targeted content by a television, the channels and/or programs each viewer watches can indicate a lot about the viewer. The demographic information about each television program or channel that is watched represents probabilities that a viewer of that television program or channel has a demographic characteristic described by that demographic information. As is well known to those skilled in the art, a large variety of demographic characteristics can be used to characterize television viewers (or, more generally, content observers of any content display system). Demographic characteristics can include, for example, age ranges (e.g., 12-18, 19-25, 25-35), gender and income.

More precise identification of a television viewer is possible if demographic information is combined from multiple channels and/or programs. Given a list of television programs and/or channels watched by a viewer, the probabilities of any particular value of a demographic characteristic can be multiplied together to get an estimate of the probability that the viewer is characterized by that value of the demographic characteristic. After calculating this probability for all values of a demographic characteristic, the value having the highest probability can be selected as the most likely value of the demographic characteristic for the viewer. Thus, the viewer is "identified" as a person having the selected demographic characteristic. As can readily be appreciated, the value of multiple demographic characteristics for a viewer can be determined in this manner.

The foregoing assumes that the probabilities of values of demographic characteristics ("demographic probability information") for each channel or program are independent of those for other channels or programs, so that the demographic probability information for multiple channels or programs can be combined by simple multiplication. However, this is not always the case, i.e., the demographic probability information for multiple channels or programs may be dependent, not independent. For example, the viewers of Star Trek also tend to watch Deep Space 9. Combining the demographic probability information from these two programs does not produce much additional information about the demographic characteristics of a viewer over that provided by the demographic probability information for one of those programs alone.

One response to the above is to only combine demographic probability information for channels or programs for which the demographic probability information is likely to be independent. For example, combining demographic probability information by multiplying probabilities from a news program and a comedy program can produce a more accurate demographic profile of a probable viewer since it is likely that the demographic probability information of those quite different programs is statistically independent.

Additionally, those skilled in the art of statistical analysis will readily appreciate how existing techniques for dealing with dependent probabilities can be used with the invention to glean as much identifying information as possible in situations in which the demographic probability information for different channels or programs is dependent. Some such techniques are described in, for example, "Unsupervised learning minimum risk pattern classification for dependent hypotheses and dependent measurements," by C. G. Hilborn, Jr. et al., IEEE Transactions on Systems Science and Cybernetics, vol. ssc-5, no. 2, April 1969, pp. 109-115, the disclosure of which is incorporated by reference herein.

As indicated above, characteristics of the manner in which a content display device is observed can also be used to assist in identification of a content observer. For example, in identifying television viewers, rudimentary gender distinctions can be based on frequency of channel switching (men are believed to switch channels more frequently than women).

Figure 5:
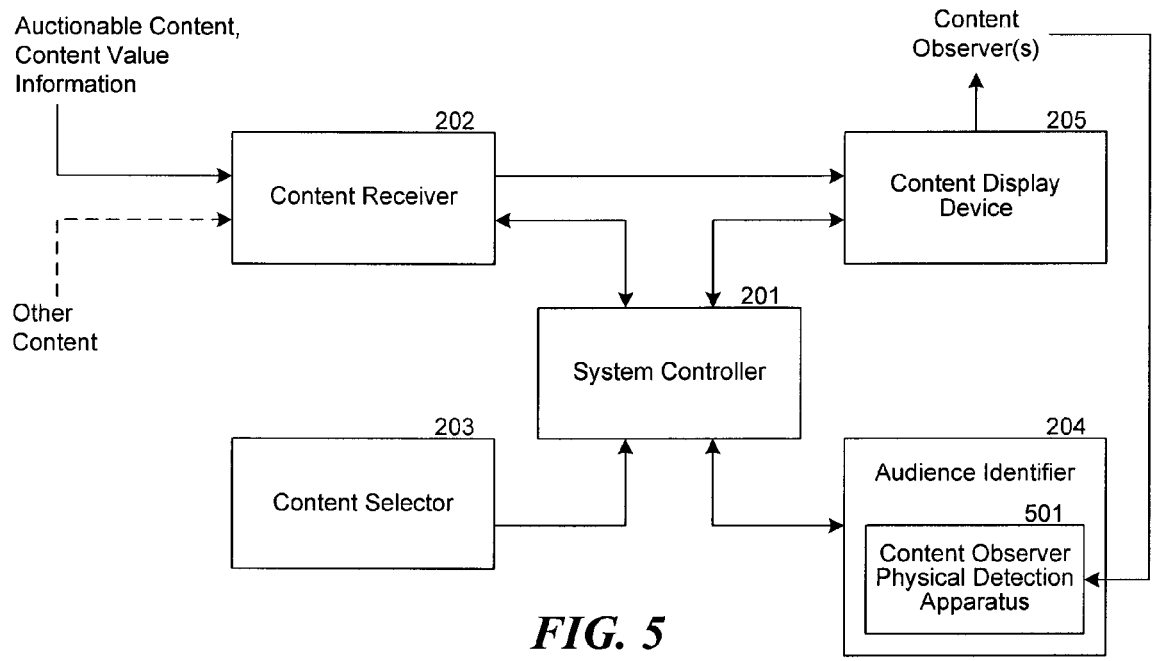
FIG. 5 is a block diagram of a system, according to still another embodiment of the invention, for use at a content display site for displaying auctionable content on a content display device at the content display site, in which a content observer physical detection apparatus can sense physical characteristic(s) of a content observer present in the vicinity of a content display device which can be used to facilitate identification of that content observer.

As indicated above, one or more devices can be used to sense physical characteristics of the people present in the vicinity of a content display device, which information then be used to associate viewing habits with a person having particular physical characteristics. Such sensing devices can include, for example, a visual data acquisition device (such as a camera) for use with a face recognition system, an audio data acquisition device for use with a voice recognition system, a fingerprint scanning device and/or a retinal scanning device. The data obtained by such devices can be processed, if necessary, to enable the data associated with one content observer to be distinguished from that associated with each other content observer. FIG. 5 is a block diagram of a system, according to still another embodiment of the invention, for use at a content display site for displaying auctionable content on the content display device 205 at the content display site, in which a content observer physical detection apparatus 501 can sense physical characteristic(s) of a content observer present in the vicinity of the content display device 205 which can be used to facilitate identification of that content observer.

A camera (or other visual data acquisition device) can be used to obtain visual images of an area in the vicinity of a content display device. Face identification methods can be used to indicate the presence of a face in such visual images and give a measure of how much a particular face in a visual image is like another in a database of facial images. For example, a clustering algorithm can be used to group the facial images identified by a face identification method into individual people (at this point, these people are still anonymous). (Particular face identification methods that can be used with the invention are described in more detail in the above-referenced United States patent applications, the disclosures of which are incorporated by reference herein, as indicated above.) The display of content at the content display site can be monitored to associate particular content displays or manners of displaying content with content observer(s) (i.e., facial images) that are present during such content display. Characteristics associated with a particular content display or manner of displaying content can then be used to identify the content observers by associating one or more such characteristics (such as gender and/or age) with each content observer. (A more accurate identification of content observers can be made if demographic information regarding the content display site indicates the number and other identifying information of possible content observer(s) at the content display site, as discussed further below.)

In addition to, or instead of, the use of a visual data acquisition device, an audio data acquisition device (e.g., one or more microphones) can be used to obtain a recording of sounds in the vicinity of a content display device. A voice recognition method can then be used to enable the identification of a content observer in a manner analogous to that described above with respect to use of face identification. (The use of voice recognition for identification of content observer(s) is advantageous in that voice recognition can also be used to enable a content observer to control the content display device using spoken commands.) Current speech recognition systems operate adequately for small vocabularies. Using echo cancellation techniques that are common in speakerphones, the known sound from a television's speaker(s) can be canceled. The remaining audio signal can then be processed by a speech recognition system which recognizes a small number of commands that can be used to control the content display device, such as, for example, "next commercial" or "show me more". Speaker identification techniques, such as those described in "Automatic speaker recognition using Gaussian mixture speaker models," by D. A. Reynolds et al., Lincoln Laboratory Journal, MIT, vol. 8, no. 2, Fall 1995, pp. 173-192, the disclosure of which is incorporated by reference herein, can enable the sensed speech to be clustered, each cluster representing an individual (anonymous) person. The display of content at the content display site can be monitored to associate particular content displays or manners of displaying content with content observer(s) (i.e., voices) that are present during such content display, as indicated by detected speech.

A fingerprint scanning device or retinal scanning device can also be used to facilitate the identification of a content observer. The data obtained by such devices for each content observer is sufficiently unique that the data need not be further processed to enable the data associated with one content observer to be distinguished from that associated with another content observer. The fingerprint or retinal scanning devices are preferably implemented so that the fingerprint or retinal scan occurs without need for the content observer to take special action. For example, a fingerprint scanning device can be implemented in a user input device that is necessary for operation of the content display system (e.g., a remote control device for operation of a television, a keyboard or mouse for operation of a computer) so that a content observer naturally grasps the input device in a manner that enables a fingerprint scan to be done automatically each time that a content observer uses the input device to operate the content display system. Fingerprint scanning devices and retinal scanning devices that can readily be modified for use with the invention are known to those skilled in that art. For example, fingerprint scanning devices such as those available from Identix Incorporated of Sunnyvale, Calif. can be modified for use with the invention.

After certain physical characteristics of content observer(s) at the content display site have been identified, the calculation of probabilities of values of demographic characteristics accurately describing content observer(s), as described above, can be used together with the information regarding the physical characteristics of content observers to provide an identification of the content observer(s) present in the vicinity of the content display system at any given time. As the available demographic information is increased, the identity estimates can be refined (i.e., have a higher probability of being correct).

Demographic information regarding the people present at a content display site that may observe a content display can also be used to predict which of multiple possible content observers at a content display site is most likely observing a particular content display. Demographic information (e.g., number of people present in a household and their ages, household income) can be obtained from companies such as Donnelley Marketing of Omaha, Nebr. (see, e.g., www.donnelleymarketing.com/prodserv/listmang/wkb2.html). This information can be used with information regarding content observation behavior (described in detail above), with or without information regarding the physical characteristics of a content observer observing a particular content display, to predict the likely content observer(s) observing a content display. For example, each television program has specific demographic data associated therewith indicating how many people of each age range and gender are, on average, watching the program. This data can be used to predict who is watching. Thus, for example, if 20% of the viewers of a television program are in the same demographic group as the mother in household, 35% of the viewers are in the same demographic group as the father in a household, and 5% of the viewers are in the same demographic group as the child in a household, the most likely viewer, without any further information, is the father. Such determinations can be made using, for example, Nielsen data regarding television watching.

As described above, static information (e.g., physical characteristics of a content observer, demographic information regarding possible content observers, information regarding content observer(s)' observation behavior) can be used to enable identification of a content observer. Changes in that information (e.g., changes in observation behavior) can also be evaluated to enable identification of a content observer. For example, a person who suddenly started watching television programs about health could be identified as a person likely to be very interested in exercise products.

A determination of the identity of a content observer can still be made, albeit with lower accuracy, if any of the foregoing information is missing. For example, without the information provided by a camera (or other device for sensing a physical characteristic of content observer(s)) the demographic characteristics of individual content observers at a content display site can not be inferred with certainty. Or, for example, if only viewing history from one television program is available, only a rudimentary guess can be made about the viewer's identity. However, because of the known value of successfully targeting content, content providers (such as television advertisers) are satisfied with content observer identifications of even very low certainty. The higher the confidence in identification of the content observers, the more a content provider will be willing to pay for display of its content to content observer(s) who have been identified as fitting a profile of interest to the content provider.

For example, the determination of the identity of a content observer can be accomplished by evaluating content observation behavior alone. This behavior can be compared to behavior that a content provider has specified as likely to identify a content observer whom the content provider is interested in reaching. For example, a seller of travel services may want to identify television viewers who are travel buffs so that they can display their content to such viewers. A determination as to whether a viewer has such a characteristic can be made by monitoring the content that is or has been viewed by the viewer: if the viewer is watching a travel program, or if the viewer watches a travel program with greater than a specified frequency (determined as percentage of all types of programs watched and/or as a temporal frequency), then a relatively high probability can be assigned to the conclusion that the viewer is a travel buff and thus is the type of viewer which the travel services seller seeks to reach. Further, as the amount of content observation information obtained increases (e.g., information regarding viewing of multiple television programs), the accuracy of the content observer identification increases.

Some content observers may be concerned about misuse of confidential information obtained as part of identification of content observers as described above. The techniques described in the above-referenced United States patent application can be used to protect confidential information regarding the content observers (as indicated above, the disclosure of that application is incorporated by reference herein). Further, privacy concerns can also be alleviated by not explicitly identifying a content observer, but, rather, identifying each content observer with a non-descriptive, generic symbol (e.g., a geometric symbol) or other identification tag (e.g., alphanumeric descriptor), the characteristics of a particular content observer being associated with each symbol or tag. The generic symbols or tags for content observers can be displayed to the content observers, offering reassurance to the content observers regarding the secrecy of their identity and confidential information describing them.

As described above, the identity and/or characteristic(s) of a content observer can be determined by making use of information regarding past content observation behavior, demographic information, information regarding physical characteristic(s) of television viewer(s) present in the vicinity of the television during past content displays, some combination of such information, or all of such information. As also described above, the methods and apparatus for determining the identity and/or characteristic(s) of a content observer described herein can be used both for particularly identifying content observer(s) present in the vicinity of a content display device at a particular time and for generally identifying content observer(s) who may be present in the vicinity of a content display device (based on monitoring of past content displays), so that, in either case, appropriate auctionable content can be displayed to the content observer(s). Given information about the content observer(s) in front of a content display device (e.g., viewer(s) in front of the television), a set of targeted content (e.g., an advertisement) can be selected for display during a targeted content display opportunity (e.g., the beginning of an advertising opportunity, which might be a commercial break in a television program or a product placement opportunity within a television program) from multiple sets of targeted content (e.g., from an inventory of targeted content stored on a data storage device at the content display site) that could potentially be displayed during the targeted content display opportunity. In particular, the invention advantageously enables a set of targeted content to be selected for display in accordance with a criterion based on the identity and/or a characteristic of the content observer(s) observing the content display device at the time of the targeted content display opportunity. The invention can also be implemented so that a set of targeted content is, additionally or alternatively, selected for display in accordance with a criterion based on the identity and/or a characteristic of the content display site, e.g., the address of the content display site. For example, a set of targeted content can be selected based on the degree to which the age, gender, income and/or interests of the content observer(s) present at the time of the targeted content display opportunity matches the age, gender, income and/or interests of content observers to whom a content provider desires to appeal with the set of targeted content. As an illustration, if a content display device is being watched by a content observer who is known to be interested in sports, an advertisement for an upcoming broadcast of a sporting event or an advertisement for sports equipment can be displayed. As can readily be appreciated, the possibilities for characterizing content observers and selecting targeted content for display based on those characterizations are nearly endless.

Figure 6:
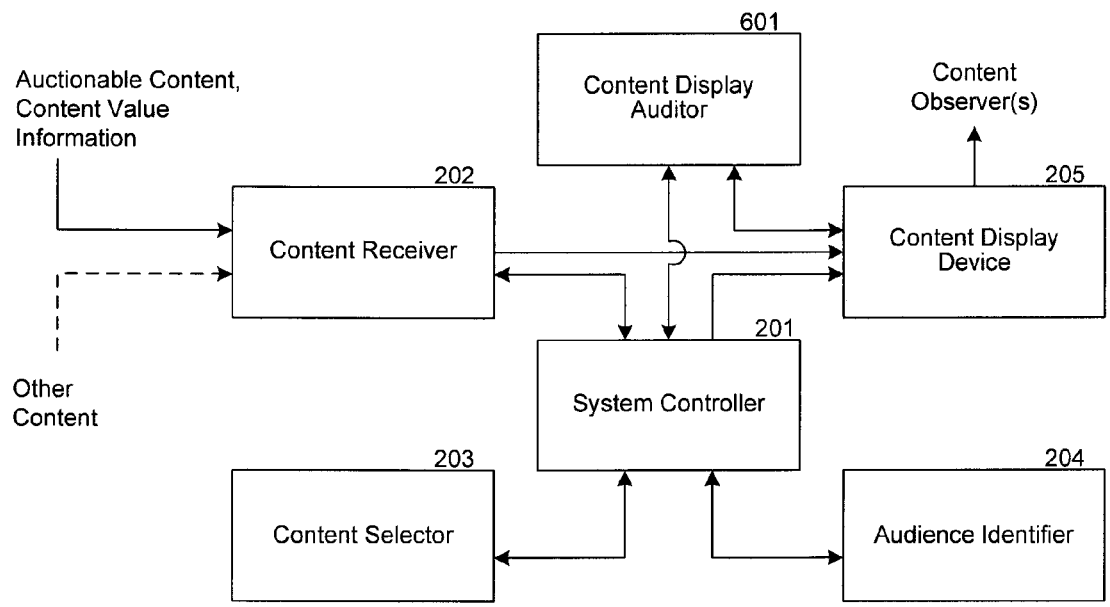
FIG. 6 is a block diagram of a system, according to another embodiment of the invention, for use at a content display site for displaying auctionable content on a content display device at the content display site, in which the display of content (and, in particular, the display of sets of auctionable content) at the content display site by the content display device is monitored by a content display monitor.

The invention can enable the display of content (and, in particular, the display of sets of targeted content) to be audited. FIG. 6 is a block diagram of a system, according to another embodiment of the invention, for use at a content display site for displaying auctionable content on the content display device 205 at the content display site, in which the display of content (and, in particular, the display of sets of auctionable content) at the content display site by the content display device 205 is monitored by a content display monitor 601.

For example, when a set of content is displayed, a counter associated with that set of content can be incremented indicating that the set of content has been displayed. A counter associated with each content observer observing the content display at that time can also be incremented indicating how often a particular content observer has observed that particular set of content. (The presence of content observer(s) at the time of a content display can be ascertained using techniques as described above.) These two counters are separate. The first counter represents aggregate information which can be used, for example, to indicate how much is owed by each content provider (e.g., advertiser) for the display of their set(s) of targeted content. The second counter can be used, for example, to facilitate identification of a content observer, as described above, or to determine whether or not to display a set of targeted content to a content observer.

The value specified by a content provider for display of a particular set of content can be made dependent on auditing information regarding display of sets of content. For example, the value placed by a content provider on display of a set of content may decrease with the number of times and/or the frequency with which the set of content is displayed at a content display site and/or to particular content observers.

The invention can be implemented so that content observer behavior during a content display is monitored and included as part of the auditing information. For example, when the invention enables display of targeted advertisements during television programs, the invention can be implemented so that the amount owed by an advertiser for display of the advertiser's advertisement depends on the viewer behavior that the advertisement induces. For instance, a different amount can be charged for the display of an advertisement when the viewer changes the channel during display of the advertisement than is charged if the viewer doesn't change the channel during display of the advertisement.

To preserve the anonymity of the content observer(s), the invention can be implemented so that the only auditing information collected concerns which content has been shown and under what conditions (e.g., the generic characteristics of the content observer(s), any information relevant to collecting payment for display of targeted set(s) of content).

The invention can be implemented so that, once collected, the auditing information is transmitted from the content display site to a different location. For example, the invention can be implemented so that all auditing information is transmitted to a neutral third party. Alternatively or additionally, the invention can be implemented so that the auditing information for each set of targeted content is transmitted to the corresponding content provider. The transmission of auditing information can be done in real time as the auditing information is acquired. Alternatively, auditing information can be collected for a period of time and a collection of auditing information transmitted from the content display site together at one time. In the latter case, it can be desirable to transmit the auditing information from the content display site at a time when communication costs are low (e.g., late at night).

The invention can be implemented in a variety of ways to provide enhanced value to content providers. For example, when the invention enables display of targeted television content, the invention can be implemented so that the same set of targeted content (e.g., advertisement) can be displayed even as a viewer changes channels, thus guaranteeing that that particular set of targeted content is displayed to the viewer. (Techniques for speeding up a live broadcast, such as are described in U.S. Pat. No. 6,005,564, can be used to ensure that the viewer doesn't miss any broadcasted content on the new channel.) As indicated above, the invention can also be implemented to keep track of the number of times each content observer has observed a particular set of targeted content. This can, for example, enable the number of times that a set of targeted content has been displayed to be controlled so as to ensure that each content observer has seen the set of targeted content often enough to get the message, but not so frequently that the content observer becomes annoyed by display of that set of targeted content.

Figure 7:
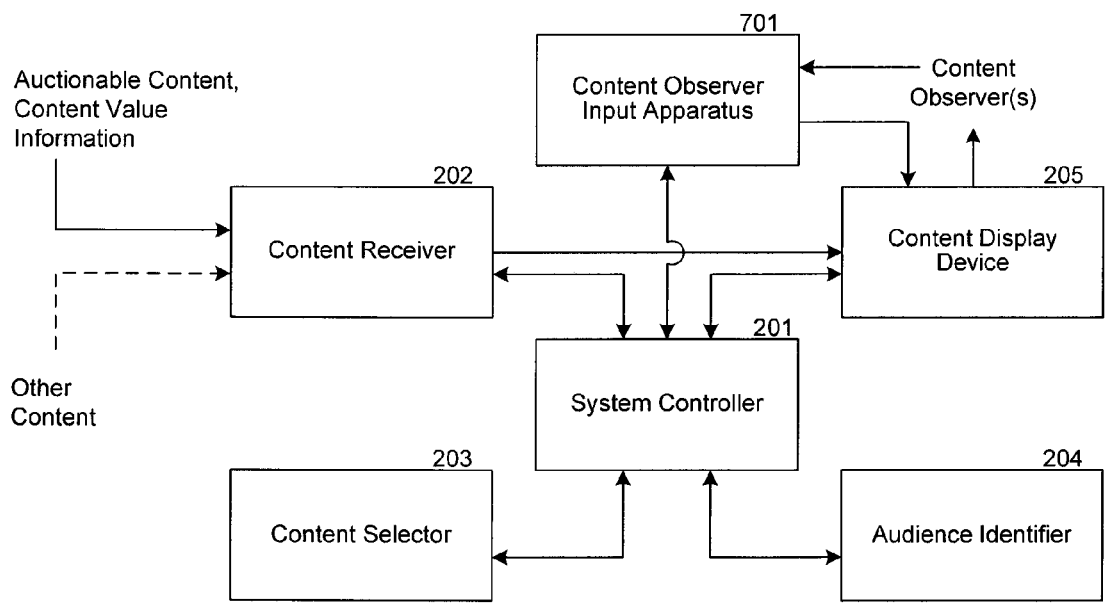
FIG. 7 is a block diagram of a system, according to yet another embodiment of the invention, for use at a content display site for displaying auctionable content on a content display device at the content display site, in which a content observer input apparatus enables a content observer to interact with the content display device and/or other components of the system.

The invention can also be implemented to enable content observers to indicate a level of satisfaction with the display of a particular set of targeted content. Additionally, the invention can be implemented to enable content observers to indicate whether they would like to observe a set of targeted content again and/or observe related set(s) of content. For example, upon viewing a StairMaster advertisement, a television viewer might decide that they want to buy other exercise equipment and indicate that they would like to see one or more (or all) related sets of content (e.g., advertisements for other exercise equipment, educational segments regarding health benefits of exercise). This aspect of the invention can be implemented in a variety of ways. (The above-referenced U.S. patent application Ser. No. 09/514,056 describes in more detail methods and apparatus that can be used in implementing this aspect of the invention.) For example, a remote control device used to control the content display device on which the sets of targeted content are displayed can include buttons (or other tactile interface mechanisms) that enable the content observer to specify appropriate instructions regarding future display of content by the content display device (e.g., a button that specifies the content should not be shown to the content observer ever again, a button that specifies that the content observer wants to see the content displayed again right away, a button that specifies that the content observer wants to see all related content). Or, a speech recognition system could be used to enable the content observer to verbalize preferences (which could be limited to a relatively small set of specific commands) which are then used to control the content display. "Integration of speaker and speech recognition systems," by D. A. Reynolds et al., International Conference on Acoustics, Speech and Signal Processing, vol. 2, 1991, pp. 869-72, the disclosure of which is incorporated by reference herein, describes techniques which can be used in implementing such a speech recognition system. Or, a visual recognition system (e.g., video camera) could be used to discern a content observer's response to the display of particular auctionable content based on visual recognition of viewer motion or appearance (e.g., did the content observer turn his face so that he was not looking at the content display device). The content observer's response can be used to effect particular control of the content display (e.g., if the content observer looked away during the display of a set of targeted content, decrease the likelihood of displaying that set of targeted content to that content observer again). FIG. 7 is a block diagram of a system, according to yet another embodiment of the invention, for use at a content display site for displaying auctionable content on the content display device 205 at the content display site, in which a content observer input apparatus 701 (e.g., tactile interface mechanism(s), speech recognition system, visual recognition system) enables a content observer to interact with the content display device 205 and/or other components of the system (via the system controller 201).

Figure 8:
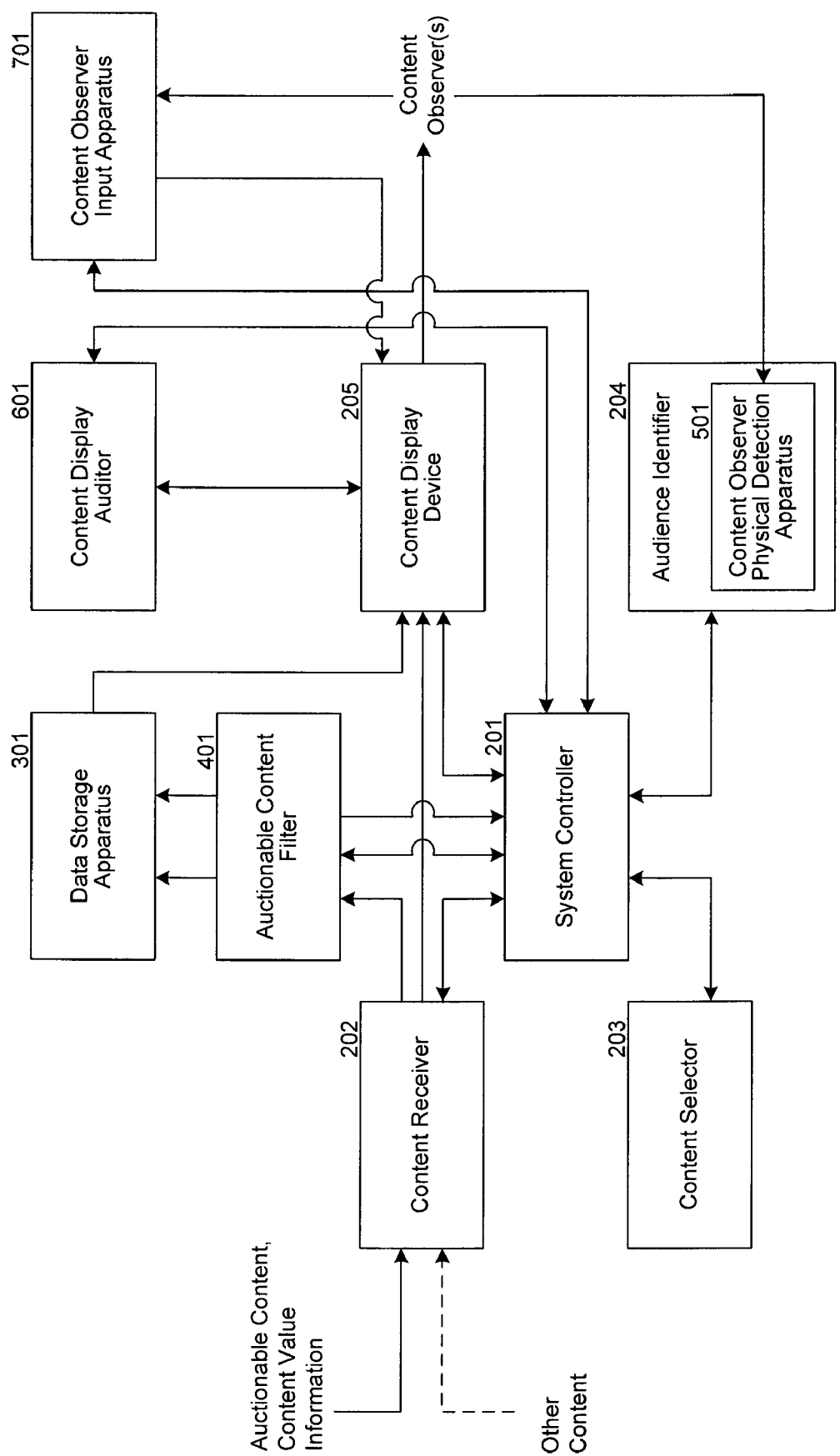
FIG. 8 is a block diagram of a system, according to still another embodiment of the invention, for use at a content display site for displaying auctionable content on a content display device at the content display site.

FIG. 8 is a block diagram of a system, according to still another embodiment of the invention, for use at a content display site for displaying auctionable content on the content display device 205 at the content display site, which includes each of the additional components (i.e., data storage device 301, auctionable content filter 401, content observer physical detection apparatus 501, content display monitor 601 and content observer input apparatus 701) shown separately as part of systems according to the invention in FIGS. 3 through 7.

Generally, the invention can be used to display any type of targeted content. For example, the invention can be used to display targeted advertisements during commercial breaks during television programs. Or, for example, the invention can be used to display targeted content (e.g., targeted product placements) within a television program. The invention can be used to distribute targeted content over a computer network such as the Internet (and, in particular, the World Wide Web portion of the Internet). The invention can also be used to display targeted content for radio programs or real-time changeable billboard displays.

Various embodiments of the invention have been described. The descriptions are intended to be illustrative, not limitative. Thus, it will be apparent to one skilled in the art that certain modifications may be made to the invention as described herein without departing from the scope of the claims set out below.

What is claimed is:

1. A computer-implemented method of displaying advertisements to viewers via a display device in order to increase value received over time from advertisers for display of the advertisements, the method comprising:
   receiving, for each of multiple advertisements, instructions from an advertiser regarding display of an advertisement,
      wherein the instructions comprise a value to be received from the advertiser for each display of the advertisement,
      wherein the value to be received from the advertiser varies for the same advertisement based on a characteristic of at least one of the viewers, and
      wherein the value to be received from the advertiser further varies for the same advertisement based on a number of viewers;
   ascertaining, at or just prior to the time of an advertisement display opportunity, a number of viewers in a vicinity of the display device and a distinctive characteristic of at least one of the viewers, wherein the distinctive characteristic is ascertained without requiring action by the at least one viewer;
   selecting, at or just prior to the time of the advertisement display opportunity, one of the multiple advertisements to display, wherein the selection is made based on the received instructions and the ascertained distinctive characteristic of the at least one viewer;
   displaying, via the display device, the selected advertisement to the number of viewers, including the at least one viewer;
   recording an indication that the displayed advertisement was displayed to the number of viewers; and
   receiving the value from the advertiser based on the recorded indication regarding the number of viewers and the ascertained distinctive characteristic of the at least one viewer.

2. The method of claim 1, further comprising:
   tracking viewing behavior of the at least one viewer, wherein the viewing behavior comprises characteristics associated with the viewer's viewing of the display device;
   predicting a number of subsequent advertisement display opportunities based on the tracked viewing behavior; and
   selecting an advertisement to be displayed during each of the predicted advertisement display opportunities based on the received instructions and the ascertained distinctive characteristic of the at least one viewer.

3. The method of claim 1 wherein the instructions further comprise a selected number of times that the advertisement is to be displayed to the at least one viewer.

4. The method of claim 1 wherein the instructions further comprise a duration of time during which the advertisement is to be displayed to the at least one viewer.

5. The method of claim 1 wherein the instructions further comprise an indication that the advertisement is not to be displayed to viewers with certain characteristics.

6. The method of claim 1 wherein the instructions further comprise an indication that the same advertisement is to be displayed on all available display channels at the same time.

7. The method of claim 1, further comprising:
   receiving, from each of the at least one viewers, for at least one of the multiple advertisements, instructions from the viewer regarding display of the at least one advertisement,
      wherein the instructions comprise a value to be received from the viewer for each display of the at least one advertisement,
   wherein the selection of one of the multiple advertisements to display to the at least one viewer is made based on the instructions received from the advertisers, the ascertained distinctive characteristic of the at least one viewer, and the instructions received from the at least one viewer.

8. The method of claim 1 wherein the value received from the advertiser is further based on the behavior of the at least one viewer during display of the advertisement, wherein the behavior is induced by the display of the advertisement.

9. A system for displaying advertisements to at least one viewer via a display device in order to increase value received over time from advertisers for display of the advertisements, the system comprising:
   means for receiving, for each of multiple advertisements, instructions from an advertiser regarding display of an advertisement, the instructions comprising:
      a value to be received from the advertiser for each display of the advertisement, wherein the value to be received varies for the same advertisement based on a characteristic of the at least one viewer, wherein the value to be received further varies for the same advertisement based on a number of viewers,
      a selected number of times that the advertisement is to be displayed to the viewer, and
      a last available date on which the advertisement may be displayed to the viewer;
   means for ascertaining, at or just prior to the time of an advertisement display opportunity, a number of viewers in a vicinity of the display device and a distinctive characteristic of at least one of the viewers, wherein the distinctive characteristic is ascertained without requiring action by the viewer;
   means for selecting, at or just prior to the time of the advertisement display opportunity, one of the multiple advertisements to display,
      wherein the selection is made based on the received instructions and the ascertained distinctive characteristic of the at least one viewer, and wherein an advertisement with a higher value to be received from an advertiser is selected before an advertisement with a lower value to be received from an advertiser, unless:

the advertisement with the higher value has already been displayed the selected number of times, or the last available date of the advertisement with the lower value occurs before the last available date of the advertisement with the higher value, so that the value received over time from the advertisers is increased for a set of advertisement display opportunities even if the advertisement with the higher value is not selected for the advertisement display opportunity, wherein the set of advertisement display opportunities includes the advertisement display opportunity;

means for displaying, via the display device, the selected advertisement to the at least one viewer;

means for recording an indication that the displayed advertisement was displayed to the at least one viewer; and means for receiving the value from the advertiser based on the recorded indication that the advertisement was displayed, the ascertained distinctive characteristic of the viewer, and the ascertained number of viewers.

10. The system of claim 9, further comprising:

means for tracking viewing behavior of the viewer, wherein the viewing behavior comprises characteristics associated with the viewer's observation of the display device;

means for predicting a number of subsequent advertisement display opportunities based on the tracked viewing behavior; and means for selecting an advertisement to be displayed during each of the predicted advertisement display opportunities based on the received instructions and the ascertained distinctive characteristic of the viewer.

11. The system of claim 9 wherein the means for selecting the advertisement to be displayed during each of the predicted advertisement display opportunities comprises:

means for scheduling for display during one or more of the predicted advertisement display opportunities an advertisement with a highest value to be received from an advertiser, wherein the scheduling comprises scheduling the selected number of displays of the advertisement with the highest value without exceeding the predicted number of advertisement display opportunities, and wherein the advertisement with the highest value is scheduled for display during predicted advertisement display opportunities that occur nearer to the last available date of the advertisement before it is scheduled for display during predicted advertisement display opportunities that occur nearer to a first available date on which the advertisement may be displayed; and means for scheduling for display, for each remaining advertisement, during one or more of the predicted advertisement display opportunities an advertisement with a next highest value to be received from an advertiser, wherein the scheduling comprises scheduling the selected number of displays of the advertisement with the next highest value without exceeding a remaining number of predicted advertisement display opportunities and without scheduling over an advertisement that has already been scheduled for display, and wherein the advertisement with the next highest value is scheduled for display during predicted advertisement display opportunities that occur nearer to the last available date of the advertisement before it is scheduled for display during predicted advertisement display opportunities that occur nearer to the first available date of the advertisement, so that advertisements with higher values to be received are scheduled for display before advertisements with lower values to be received, while filling in each of the predicted advertisement display opportunities.

12. The system of claim 9 wherein the instructions further comprise an indication that the same advertisement is to be displayed on all available display channels at the same time.

13. The method of claim 9 wherein the instructions further comprise a selected frequency with which the advertisement is displayable to the viewer.

14. The method of claim 9 wherein the instructions further comprise specified times or ranges of times during which the advertisement may be displayed to the viewer.

15. The method of claim 14 wherein the specified times or ranges of times are defined relative to another display of the same advertisement or to a display of another advertisement.

16. The system of claim 9 wherein the value received from the advertiser is further based on the behavior of the viewer during display of the advertisement, wherein the behavior is induced by the display of the advertisement.

17. A computer-readable medium encoded with processing instructions for implementing a method, performed by a computer, for displaying content to content observers via a display device in order to increase value received over time from content providers for display of the content, the method comprising:

receiving, for each of multiple sets of content, instructions from a content provider regarding display of a set of content, the instructions comprising:

a value to be received from the content provider for each display of the set of content, wherein the value to be received varies for the same set of content based on a characteristic of at least one of the content observers, and wherein the value to be received further varies for the same set of content based on a number of content observers, a selected number of times that the set of content is to be displayed to a content observer, and a last available date on which the set of content may be displayed to the content observer;

ascertaining, at or just prior to the time of a content display opportunity, a number of content observers in a vicinity of the display device and a distinctive characteristic of at least one of the content observers, wherein the distinctive characteristic is ascertained without requiring action by the at least one content observer;

selecting, at or just prior to the time of the content display opportunity, one of the multiple sets of content to display, wherein the selection is made based on the received instructions and the ascertained distinctive characteristic of the at least one content observer, and wherein a set of content with a higher value to be received from a content provider is selected before a set of content with a lower value to be received from a content provider, unless:

the set of content with the higher value has already been displayed the selected number of times, or the last available date of the set of content with the lower value occurs before the last available date of the set of content with the higher value, so that the value received over time from the content providers is increased for a set of content display opportunities even if the set of content with the higher value is not selected for the content display opportunity, wherein the set of content display opportunities includes the content display opportunity;

displaying, via the display device, the selected set of content to the number of content observers, including the at least one content observer;

recording an indication that the displayed set of content was displayed to the number of content observers; and receiving the value from the content provider based on the recorded indication regarding the number of content observers and the ascertained distinctive characteristic of the at least one content observer.

18. The computer-readable medium of claim 17, further comprising:

tracking observation behavior of the at least one content observer, wherein the observation behavior comprises characteristics associated with the content observer's observation of the display device;

predicting a number of subsequent content display opportunities based on the tracked observation behavior; and selecting a set of content to be displayed during each of the predicted content display opportunities based on the received instructions and the ascertained distinctive characteristic of the at least one content observer.

19. The computer-readable medium of claim 17 wherein selecting the set of content to be displayed during each of the predicted content display opportunities comprises:

scheduling for display during one or more of the predicted content display opportunities a set of content with a highest value to be received from a content provider, wherein the scheduling comprises scheduling the selected number of displays of the set of content without exceeding the predicted number of content display opportunities, and wherein the set of content with the highest value is scheduled for display during predicted content display opportunities that occur nearer to the last available date of the set of content before it is scheduled for display during predicted content display opportunities that occur nearer to a first available date on which the set of content may be displayed; and scheduling for display, for each remaining set of content, during one or more of the predicted content display opportunities a set of content with a next highest value to be received from a content provider, wherein the scheduling comprises scheduling the selected number of displays of the set of content with the next highest value without exceeding a remaining number of predicted content display opportunities and without scheduling over a set of content that has already been scheduled for display, and wherein the set of content with the next highest value is scheduled for display during predicted content display opportunities that occur nearer to the last available date of the set of content before it is scheduled for display during predicted content display opportunities that occur nearer to the first available date of the set of content, so that sets of content with higher values to be received are scheduled for display before sets of content with lower values to be received, while filling in each of the predicted content display opportunities.

20. The computer-readable medium of claim 17, further comprising:

receiving, from each of the at least one content observers, for at least one of the multiple sets of content, instructions from the content observer regarding display of the at least one set of content, the instructions comprising:

a value to be received from the content observer for each display of the at least one set of content, a selected number of times that the at least one set of content is to be displayed to the content observer, and a last available date on which the at least one set of content may be displayed to the content observer, wherein the selection of one of the multiple sets of content to display to the at least one content observer is made based on the instructions received from the content providers, the ascertained distinctive characteristic of the at least one content observer, and the instructions received from the at least one content observer.

* * * * *

UNITED STATES PATENT AND TRADEMARK OFFICE
CERTIFICATE OF CORRECTION

PATENT NO.         : 7,661,116 B2
APPLICATION NO.    : 11/869369
DATED              : February 9, 2010
INVENTOR(S)        : Malcolm Slaney et al.

It is certified that error appears in the above-identified patent and that said Letters Patent is hereby corrected as shown below:

Title page 3, in column 2, under "Other Publications", line 2, delete "'Inidvidualized" and insert -- Individualized --, therefor.

Title page 3, in column 2, under "Other Publications", line 21, delete "Internatioanale" and insert -- Internationale --, therefor.

In column 8, line 64, delete "can be then be" and insert -- can then be --, therefor.

Signed and Sealed this

Fourth Day of May, 2010

David J. Kappos
*Director of the United States Patent and Trademark Office*